United States Patent [19]

Hurter

[11] Patent Number: 4,918,183

[45] Date of Patent: Apr. 17, 1990

[54] MONOAZO DYES, PROCESS FOR THEIR PREPARATION, AND THE USE THEREOF

[75] Inventor: Rudolf Hurter, Basel, Switzerland

[73] Assignee: Ciba-Geigy Corporation, Ardsley, N.Y.

[21] Appl. No.: 790,656

[22] Filed: Oct. 24, 1985

Related U.S. Application Data

[63] Continuation of Ser. No. 517,605, Jul. 27, 1983, abandoned.

[30] Foreign Application Priority Data

Aug. 4, 1982 [CH] Switzerland .................. 4696/82

[51] Int. Cl.$^4$ .................. C09B 62/507; C09B 62/527; C09B 62/66; C09B 62/82
[52] U.S. Cl. .................. 534/617; 534/591; 534/598; 534/632; 534/635; 534/636; 534/637; 534/638; 534/639; 534/640; 534/641; 534/642; 534/643; 534/73; 534/749; 534/750; 534/780; 534/793; 534/845; 534/860; 534/882; 562/65; 562/68; 562/72
[58] Field of Search .............. 534/640, 641, 642, 643, 534/639, 637, 638, 632, 860, 882, 845, 750, 780, 749, 617, 739, 636, 635, 793

[56] References Cited

U.S. PATENT DOCUMENTS

| 3,045,005 | 7/1962 | Jung et al. | 534/638 X |
| 3,136,752 | 6/1964 | Jung et al. | 534/638 X |
| 3,417,076 | 12/1968 | Sartori | 534/603 X |
| 3,692,769 | 9/1972 | Weaver et al. | 534/603 X |
| 4,042,580 | 8/1977 | Grobbke | 534/603 X |
| 4,046,757 | 9/1977 | Maybeck et al. | 534/603 X |
| 4,119,624 | 10/1978 | Boyd et al. | 534/603 X |
| 4,267,104 | 5/1981 | Giles et al. | 534/603 X |

FOREIGN PATENT DOCUMENTS

| 0042357 | 6/1981 | European Pat. Off. | 534/603 X |
| 1221165 | 5/1960 | France | 534/603 X |
| 1236190 | 6/1960 | France | 534/603 X |
| 222693 | 10/1942 | Switzerland | 534/603 X |
| 222697 | 10/1942 | Switzerland | 534/603 X |
| 222699 | 10/1942 | Switzerland | 534/603 X |
| 364570 | 11/1962 | Switzerland | 534/603 X |
| 868474 | 5/1961 | United Kingdom | 534/603 X |
| 917725 | 2/1963 | United Kingdom | 534/603 X |
| 922162 | 3/1963 | United Kingdom | 534/603 X |
| 2021615 | 12/1979 | United Kingdom | 534/603 X |

Primary Examiner—Floyd D. Higel
Attorney, Agent, or Firm—Wenderoth, Lind & Ponack

[57] ABSTRACT

The invention relates to monoazo dyes of the formula

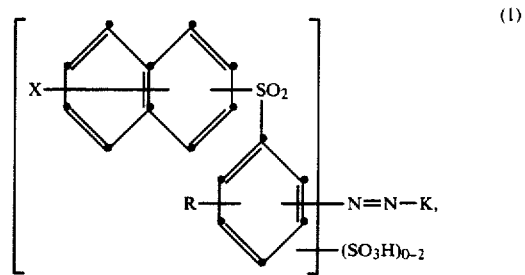

wherein K is the radical of a coupling component of the benzene, naphthalene or heterocyclic series, and R is hydrogen, halogen, carboxy, a $C_1$–$C_6$alkyl, $C_1$–$C_6$alkoxy, $C_2$–$C_6$alkanoylamino, $C_1$–$C_6$alkylsulfonylamino, $C_1$–$C_6$alkylsulfonyl, phenyl($C_1$–$C_4$)alkylsulfonyl or naphthyl($C_1$–$C_4$)alkylsulfonyl or benzoyl radical, which radicals may be further substituted, or is a

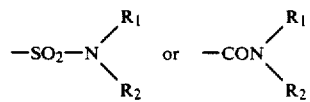

group, wherein each of $R_1$ and $R_2$ independently of the other is hydrogen or a $C_1$–$C_6$alkyl, $C_5$–$C_7$cycloalkyl, phenyl or naphthyl radical, which radicals may be further substituted, and wherein X is hydrogen, halogen or a $C_1$–$C_6$alkyl, $C_1$–$C_6$alkoxy, $C_2$–$C_6$alkanoylamino or $C_1$–$C_6$alkylsulfonylamino radical, which radicals may be further substituted.

These dyes give dyeings of good light- and wetfastness properties on polyamide material.

9 Claims, No Drawings

MONOAZO DYES, PROCESS FOR THEIR PREPARATION, AND THE USE THEREOF

This application is a continuation, of now abandoned application Ser. No. 517,605, filed Jul. 27, 1983.

It is the object of the present invention to provide novel monoazo dyes which are suitable for dyeing natural and synthetic polyamides from an aqueous bath, have shades in the range from yellow to red, and further have improved fastness properties, in particular improved lightfastness. It has been found that this object is accomplished with the monoazo dyes of the formula I.

Accordingly, the present invention relates to monoazo dyes of the formula

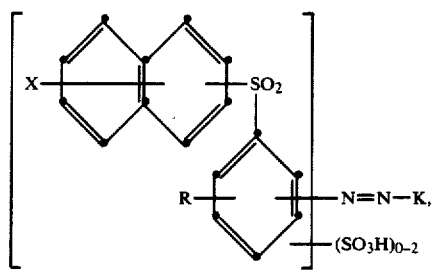

(1)

wherein K is the radical of a coupling component of the benzene, naphthalene or heterocyclic series, and R is hydrogen, halogen, carboxy, a $C_1$–$C_6$alkyl, $C_1$–$C_6$alkoxy, $C_2$–$C_6$alkanoylamino, $C_1$–$C_6$alkylsulfonylamino, $C_1$–$C_6$alkylsulfonyl, phenyl($C_1$–$C_4$)alkylsulfonyl or naphthyl($C_1$–$C_4$)alkylsulfonyl or benzoyl radical, which radicals may be further substituted, or is a

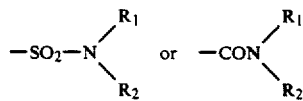

group, wherein each of $R_1$ and $R_2$ independently of the other is hydrogen or a $C_1$–$C_6$alkyl, $C_5$–$C_7$cycloalkyl, phenyl or naphthyl radical, which radicals may be further substituted, and wherein X is hydrogen, halogen or a $C_1$–$C_6$alkyl, $C_1$–$C_6$alkoxy, $C_2$–$C_6$alkanoylamino or $C_1$–$C_6$alkylsulfonylamino radical, which radicals may be further substituted.

K is preferably the radical of an aminobenzene or alkoxybenzene, of an aminonaphthalene or alkoxynaphthalene, of a phenol, naphthol, aminonaphthol, pyrazolone, aminopyrazole, pyridone, pyrimidine, indole, diphenylamine, acetoacetamide, naphthimidazole, tetrahydroquinoline or pyrazolo[2,3-a]pyrimidine, which radicals may be further substituted.

The radical K of a coupling component may contain the customary substituents of azo dyes, e.g. $C_1$–$C_4$alkyl groups such as methyl, ethyl, propyl, isopropyl, butyl, isobutyl, sec-butyl and tert-butyl; $C_1$–$C_4$alkoxy groups such as methoxy, ethoxy, propoxy, isopropoxy, butoxy, isobutoxy, sec-butoxy and tert-butoxy, phenoxy; $C_1$–$C_6$alkanoylamino groups such as acetamido or propionamido, benzoylamino; amino groups such as —NH$_2$, methylamino, ethylamino, dimethylamino, diethylamino, cyanoethylamino, hydroxyethylamino, dihydroxyethylamino, cyclohexylamino, benzylamino and phenylamino; carboxylic acid ester groups such as carbomethoxy and carboethoxy; trifluoromethyl, nitro, cyano, acetyl, methylsulfonyl, carbamoyl, sulfamoyl, ureido, hydroxy, carboxy, sulfo, sulfomethyl; halogen such as fluorine, chlorine and bromine; and fibre-reactive radicals.

R and X as halogen may each independently be selected from fluorine, chlorine and bromine.

R, $R_1$, $R_2$ and X as $C_1$–$C_6$alkyl may each independently be selected from the group consisting of methyl, ethyl, propyl, isopropyl, butyl, isobutyl, sec-butyl, tert-butyl, pentyl or hexyl, which radicals may be further substituted, e.g. by halogen such as fluorine, chlorine or bromine, or by hydroxy, sulfato, sulfo, carboxy, cyano, $C_1$–$C_4$alkoxy such as methoxy, ethoxy, propoxy, isopropoxy, butoxy, sec-butoxy, isobutoxy or tert-butoxy, or by $C_1$–$C_6$alkanoyl groups such as the acetyl or propionyl group, the benzoyl group, phenyl, naphthyl, and cycloalkyl such as cyclohexyl. Examples of such radicals are: methyl, ethyl, β-chloroethyl, β-hydroxyethyl, β-cyanoethyl, propyl, β-sulfoethyl, isopropyl, n-butyl, pentyl, trifluoromethyl, hexyl, cyclohexylmethyl, benzyl, phenethyl and naphthylmethyl.

R and X as $C_1$–$C_6$alkoxy may each independently be selected from the group consisting of methoxy, ethoxy, propoxy, isopropoxy, butoxy, sec-butoxy, isobutoxy, pentyloxy or hexyloxy, which radicals may be further substituted, e.g. by halogen such as fluorine, chlorine or bromine, or by hydroxy, carboxy and sulfo.

R and X as $C_2$–$C_6$alkanoylamino may each independently be selected from the group consisting of acetamido, propionamido or butyrylamino, which radicals may be further substituted, e.g. by halogen, such as fluorine, chlorine or bromine. A typical example is the β-bromopropionylamino radical.

R and X as $C_1$–$C_6$alkylsulfonylamino may each independently be selected from the group consisting of methylsulfonylamino, ethylsulfonylamino, propylsulfonylamino, butylsulfonylamino or hexylsulfonylamino, which radicals may be further substituted, e.g. by halogen such as fluorine, chlorine or bromine, or by $C_1$–$C_4$alkoxy such as methoxy.

R as $C_1$–$C_6$alkylsulfonyl may be selected from the group consisting of methylsulfonyl, ethylsulfonyl, propylsulfonyl, isopropylsulfonyl, butylsulfonyl, sec-butylsulfonyl, tert-butylsulfonyl, pentylsulfonyl or hexylsulfonyl, with methylsulfonyl or ethylsulfonyl being preferred.

R as phenyl($C_1$–$C_4$)alkylsulfonyl or naphthyl($C_1$–$C_4$)alkylsulfonyl may be selected from the group consisting of benzyl-, phenethyl- or naphthylmethylsulfonyl, which radicals may be further substituted in the aryl moiety, e.g. by $C_1$–$C_4$alkyl groups such as methyl, $C_1$–$C_4$alkoxy groups such as methoxy or ethoxy, or by halogen such as fluorine, chlorine or bromine, or by $C_1$–$C_6$alkanoylamino groups such as acetamido, or by hydroxy, carboxy and sulfo.

R as a benzoyl radical may be substituted, e.g. by $C_1$–$C_4$alkyl groups such as methyl, $C_1$–$C_4$alkoxy groups such as methoxy and ethoxy, or halogen such as fluorine, chlorine or bromine, or by $C_1$–$C_6$alkanoylamino groups such as acetamido, or by hydroxy, carboxy and sulfo. Examples of such radicals are: 4-methyl-3-sulfobenzoyl, 4-chloro-3-sulfobenzoyl.

$R_1$ and $R_2$ as $C_5$–$C_7$cycloalkyl may each independently be selected from the group consisting of cyclopentyl, cyclohexyl or cycloheptyl, which radicals may be further substituted, e.g. by halogen such as fluorine, chlorine or bromine, $C_1$–$C_4$alkyl such as methyl, ethyl, propyl or isopropyl, $C_1$–$C_4$alkoxy such as methoxy. The methylcyclohexyl radical may be cited as an example.

$R_1$ and $R_2$ as a phenyl or naphthyl radical may be further substituted e.g. by $C_1$–$C_4$alkyl groups such as methyl, ethyl, propyl, isopropyl and butyl, $C_1$–$C_4$alkoxy groups such as methoxy and ethoxy, or by halogen such as fluorine, chlorine and bromine, or by $C_1$–$C_6$alkanoylamino groups such as acetamido, or by hydroxy, carboxy and sulfo.

Preferred monoazo dyes of the formula (1) are those wherein (a) the radical —N=N—K is attached to the phenyl ring in the ortho- or para-position to the —SO$_2$ group, (b) the molecules contain 1 to 3 sulfo groups, and (c) X is hydrogen or $C_2$–$C_4$alkanoylamino.

The monoazo dyes may be substituted in the coupling component K by fibre-reactive groups.

Suitable fibre-reactive groups are e.g. those of the aliphatic series, such as acryloyl, mono-, di- or trichloroacryloyl or -metacryloyl, or mono-, di- or tribromoacryloyl or -metacryloyl, e.g. —CO—CH=CH—Cl, —CO—CCl=CH$_2$, —CO—CH=CHBr, —COCBr=CH$_2$, —CO—CBr=CHBr, —CO—CCl=CH—CH$_3$, —CO—CCl=CH—COOH, —CO—CH=CCl—COOH, 2-chloropropionyl, 3-phenylsulfonylpropionyl, 3-methylsulfonylpropionyl, β-sulfatoethylaminosulfonyl, vinylsulfonyl, β-chloroethylsulfonyl, β-sulfatoethylsulfonyl, β-methylsulfonylethylsulfonyl, β-phenylsulfonylethylsulfonyl, 2-fluoro-2-chloro-3,3-difluorocyclobutane-1-carbonyl, 2,2,3,3-tetrafluorocyclobutanecarbon-1-or -sulfon-1-yl, β-(2,2,3,3-tetrafluorocyclobut-1-yl)-acryloyl, α- or β-alkyl- or -arylsulfonylacryloyl, such as α- or β-methylsulfonylacryloyl.

Reactive radicals which are particularly suitable for synthetic polyamide and for wool are: chloroacetyl, bromoacetyl, α,β-dichloropropionyl or α,β-dibromopropionyl, α-chloroacryloyl or α-bromoacryloyl, 2,4-difluoro-5-chloropyrimid-6-yl, 2,4,6-trifluoropyrimid-5-yl, 2,4-dichloro-5-methylsulfonylpyrimid-6-yl, 2,4-difluoro-5-methylsulfonylpyrimid-6-yl, 2,4-difluorotriazin-6-yl, as well as fluorotriazinyl radicals of the formula

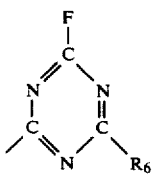

wherein $R_6$ is an unsubstituted or substituted amino group or a free or etherified oxy or thio group, e.g. the —NH$_2$ group, an amino group which is substituted by one or two $C_1$–$C_4$alkyl radicals, a $C_1$–$C_4$alkoxy group, a $C_1$–$C_4$alkylmercapto group, arylamino, especially phenylamino, or phenylamino which is substituted by methyl, methoxy, chlorine and, in particular, sulfo, or phenoxy, mono- or disulfophenyloxy etc., as well as the corresponding chlorotriazinyl radicals.

Examples of starting materials for introducing such triazine radicals are: 2,4-difluoro- or 2,4-dichloro-6-aminotriazine, 2,4-difluoro- or 2,4-dichloro-6-methylaminotriazine, 2,4-difluoro- or 2,4-dichloro-6-ethylaminotriazine, 2,4-difluoro- or 2,4-dichloro-6-phenylaminotriazine, 2,4-difluoro- or 2,4-dichloro-6-(2',3'-or 4'sulfophenyl)-aminotriazine, 2,4-difluoro- or 2,4-dichloro-6-(2',4'-or 3',4'- or 2',5'- or 4',5'-disulfophenyl)-aminotriazine, 2,4-difluoro- or 2,4-dichloro-6-dimethylaminotriazine, 2,4-difluoro- or 2,4-dichloro-6-methoxytriazine, 2,4-difluoro-or 2,4-dichloro-6-(β-methoxyethoxy)-triazine, 2,4-difluoro-or 2,4-dichloro-6-methylmercaptotriazine, 2,4-difluoro- or 2,4-dichloro-6-phenylmercaptotriazine, and 2,4,6-trichlorotriazine or 2,4,6-trifluorotriazine.

Particularly preferred monoazo dyes of the formula (1) are those wherein K is a N—$C_1$–$C_4$alkylaminobenzene or N,N-di($C_1$–$C_4$)alkylaminobenzene radical which may be substituted in the benzene ring by methyl, methoxy or acetamido, and wherein the N-alkyl moieties may each independently be substituted by cyano, hydroxy, sulfo or phenyl, or is a $C_1$–$C_2$alkoxybenzene radical which may be substituted by methyl; a methoxynaphthalene radical, a phenol radical which is substituted by methyl, an aminonaphthalene radical which may be substituted by sulfo, a hydroxynaphthalene radical which is substituted by sulfo, an aminonaphthol radical which is substituted in the naphthalene nucleus by sulfo, and wherein the amino group may be substituted by methyl, α,β-dibromopropionyl, α,β-dibromoproprionylaminobenzoyl and 2,6-difluoro-5-chloropyrimidylaminobenzoyl; or is a 1-phenyl-3-methylpyrazol-5-one radical which may be substituted in the phenyl nucleus by methyl, ethyl or chlorine, a 1-phenyl-3-methylaminopyrazole radical which may be substituted in the phenyl nucleus by chlorine and sulfo, a 2-methylindole radical, a 1-chlorophenylamino-2-pentylnaphthimidazole radical which is substituted in the naphthalene nucleus by hydroxy and sulfo, a 1-ethyl-4-methyl-3-carbamoyl-6-hydroxypyrid-2-one radical, a N-methyl-or N-ethyl-1,2,3,4-tetrahydroquinoline radical or a 2,4,6-triaminopyrimidine radical, and wherein R is hydrogen, chlorine, methyl, methoxy, carboxy, trifluoromethyl, acetamido, $C_1$–$C_2$alkylsulfonyl, a

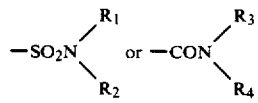

group, wherein $R_1$ is hydrogen or methyl, $R_2$ is hydrogen, $C_1$–$C_2$alkyl, cyclohexyl, β-hydroxyethyl, β-sulfoethyl, sulfophenyl which may be substituted by methyl, methoxy, chlorine, acetamido and carboxy; disulfophenyl, and mono- or disulfonaphthyl, $R_3$ is hydrogen or methyl and $R_4$ is hydrogen, methyl, β-sulfoethyl or sulfophenyl, or is a benzoyl radical which is substituted in the benzene nucleus by sulfo and may be further substituted by chlorine or methyl; and X is hydrogen or acetamido.

Particularly preferred monoazo dyes of the formula (1) are those wherein (a) K is a N,N-di($C_1$–$C_4$)alkylaminobenzene radical which may be substituted in the benzene ring by methyl, methoxy and acetamido, and wherein the N-alkyl moieties may each independently be substituted by cyano, hydroxy, sulfo or phenyl, or is a 1-phenyl-3-methylaminopyrazole radical which may be substituted in the phenyl nucleus by chlorine and sulfo, or is a 2-methylindole radical, (b) X is hydrogen, and (c) R is attached to the phenyl nucleus in the ortho- or para-position to the —SO$_2$ group.

The monoazo dyes of the formula

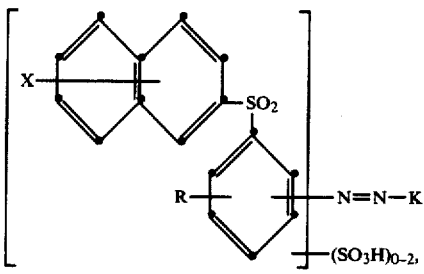
(2)

wherein K, R and X are as defined above, are also especially preferred.

Most preferred are the monoazo dyes of the formula

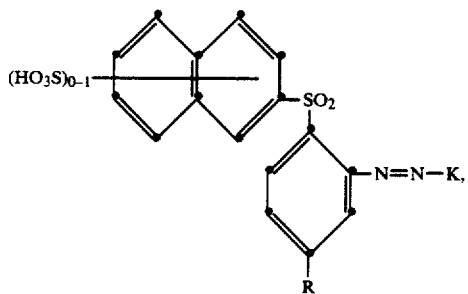
(3)

wherein K is a 3-methyl-N,N-diethylaniline radical, a 3-methyl-N,N-di-n-butylaniline radical, a 1-phenyl-3-methyl-5-aminopyrazole radical, a 1-(2'-chloro-5'-sulfophenyl)-3-methyl-5-aminopyrazole radical or a 2-methylindole radical, and R is chlorine, trifluoromethyl, sulfo or —$SO_2NH_2$, which monoazo dyes contain only one sulfo group.

The present invention also relates to a process for the preparation of the monoazo dyes of the formula (1), which process comprises diazotising a diazo component of the formula

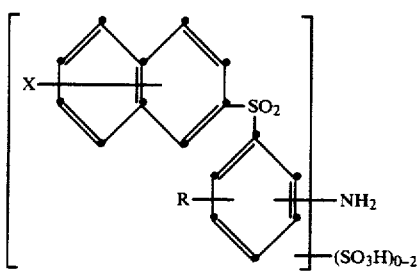
(4)

and coupling the diazonium compound to a coupling component of the formula

H-K             (5)

in which formulae above K, R and X are as defined for formulae (1).

The diazotisation of the diazo component of the formula (4) is normally carried out by treatment with nitrous acid in an aqueous solution of mineral acid at low temperature; and the coupling to the coupling component of the formula (5) is carried out at acid, neutral or alkaline pH values.

If desired, a free amino group in the radical K may be converted, after coupling, into an acylamino or alkylamino group with an acylating agent, and a hydroxy group in the radical K may likewise be converted into an alkoxy group by alkylation.

The azo dyes of the formula (1) which contain a fibre-reactive radical are obtained by reacting, in any order, a diazo component of the formula (4), a coupling component of the formula (5) which contains an acylatable amino or hydroxy group, and an acylating agent which contains a fibre-reactive radical.

As coupling components which contain an acylatable group, it is preferred to use those of the benzene or naphthalene series.

Preferred process variants comprise using a diazo component of the formula (4), wherein (a) the $NH_2$ group is attached to the phenyl ring in the ortho- or para-position to the —$SO_2$ group, and (b) X is hydrogen or $C_1$-$C_4$alkanoylamino.

The preferred process variants further comprise using a coupling component of the formula (5), wherein K is the radical of an aminobenzene, aminonaphthalene, phenol, naphthol, aminonaphthol, pyrazolone, aminopyrazole, pyridone, pyrimidine, indole, diphenylamine, acetoacetamide, naphthimidazole, tetrahydroquinoline or pyrazole[2,3-a]pyrimidine, which radicals may be further substituted.

It is preferred to use diazo components of the formula (4) and coupling components of the formula (5) which together contain 1 to 3 sulfonic acid groups.

The particularly preferred monoazo dyes of the formula (1) are obtained by diazotising a diazo component of the formula (4), wherein R is hydrogen, chlorine, methyl, carboxy, trifluoromethyl, acetamido, $C_1$-$C_2$alkylsulfonyl, a

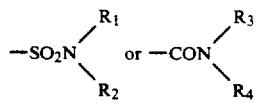

group, wherein $R_1$ is hydrogen or methyl, $R_2$ is hydrogen, $C_1$-$C_2$alkyl, cyclohexyl, $\beta$-hydroxyethyl,$\beta$-sulfoethyl, sulfophenyl which may be substituted by methyl, methoxy, chlorine, acetamido and carboxy, or is disulfophenyl and mono-or disulfonaphthyl, $R_3$ is hydrogen or methyl and $R_4$ is hydrogen, methyl, $\beta$-sulfoethyl or sulfophenyl, or is a benzoyl radical which is substituted in the benzene nucleus by sulfo and may be further substituted by chlorine or methyl, and wherein X is hydrogen or acetamido, and coupling the diazonium compound to a coupling component of the formula (5), wherein K is a N—$C_1$-$C_4$alkylaminobenzene or N,N-di($C_1$-$C_4$)alkylaminobenzene radical which may be substituted in the benzene ring by methyl, methoxy and acetamido, and wherein the N-alkyl moieties may each independently by substituted by cyano, hydroxy, sulfo or phenyl, or is a phenol radical which is substituted by methyl, an aminonaphthalene radical which may be substituted by sulfo, a hydroxynaphthalene radical which is substituted by sulfo, an aminonaphthol radical which is substituted in the naphthalene nucleus by sulfo, and wherein the amino group may be substituted by methyl, $\alpha,\beta$-dibromopropionyl, $\alpha,\beta$-dibromopropionamidobenzoyl and 2,6-difluoro-5- chloropyrimidylaminobenzoyl, or is a 1-phenyl-3-methylpyrazol-5-one radical which may be substituted in the phenyl nucleus by methyl, ethyl and chlorine, or a 1-phenyl-3-methylaminopyrazole radical which may be substituted in the phenyl nucleus by chlorine and sulfo, or is a 2-methylindole radical, a 1-chlorophenylamino-2-pentylnaphthimidazole radical which is substituted in the naphthalene nucleus by hydroxy and sulfo, or is a 1-ethyl-4-methyl-3-carbamoyl-6-hydroxypyrid-2-one radical, a N-methyl- or N-ethyl-1,2,3,4-tetrahydroquinoline radical or a 2,4,6-triaminopyrimidine radical.

It is preferred to use diazo components of the formula (4), wherein
(a) X is hydrogen, and
(b) R is linked to the phenyl ring in the ortho- or para-position to the —SO$_2$ group; and coupling components of the formula (5), wherein K is a N,N-di(C$_1$-C$_4$)-alkylaminobenzene radical which may be substituted in the benzene ring by methyl, methoxy and acetamido, and wherein the N-alkyl moieties may each independently be substituted by cyano, hydroxy, sulfo or phenyl, or is a 1-phenyl-3-methylaminopyrazole radical which may be substituted in the phenyl nucleus by chlorine and sulfo, or is a 2-methylindole radical.

It is also preferred to use diazo components of the formula

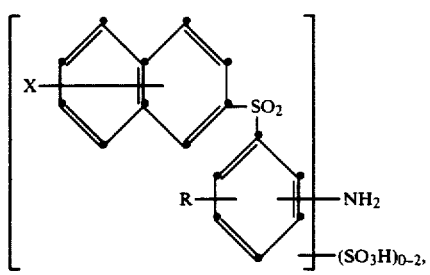

(6)

wherein R and X have the given meanings.

The particularly preferred monoazo dyes of the formula (3) are obtained by diazotising a diazo component of the formula

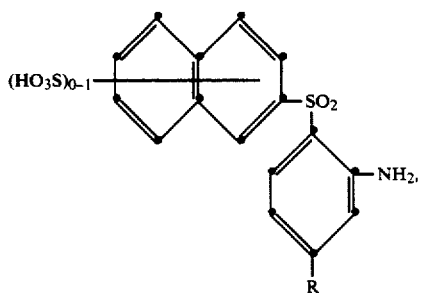

(7)

wherein R is chlorine, trifluoromethyl, sulfo or —SO$_2$NH$_2$, which contains not more than one sulfo group, and coupling the diazonium compound to a coupling component of the formula (5), wherein K is a 3-methyl-N,N-diethylaniline radical, a 3-methyl-N,N-di-n-butylaniline radical, a 1-phenyl-3-methyl-5-aminopyrazole radical, a 1-(2'-chloro-5'-sulfophenyl)-3-methyl-5-aminopyrazole radical or a 2-methylindole radical, with the proviso that the resultant monoazo dye contains only one sulfo group.

A process variant relates to the preparation of mixtures of monoazo dyes of the formulae

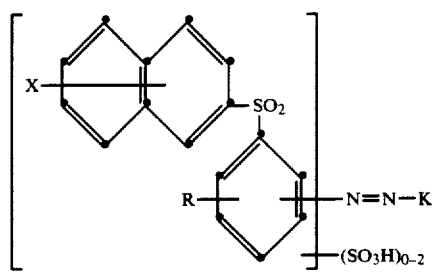

(2)

and

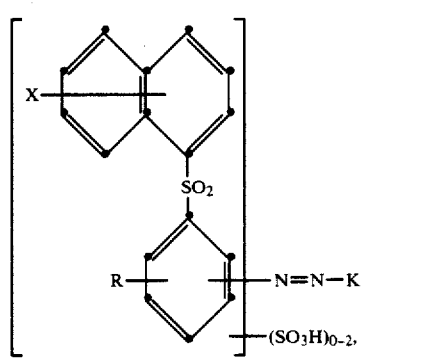

(8)

wherein K, R and X are as defined for formula (1). The process comprises diazotising a mixture of the diazo components of the formulae

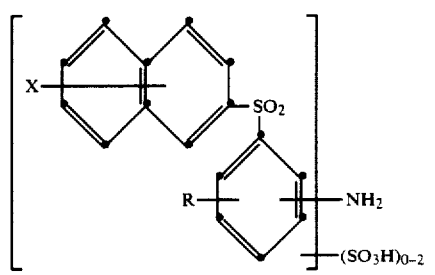

(6)

and

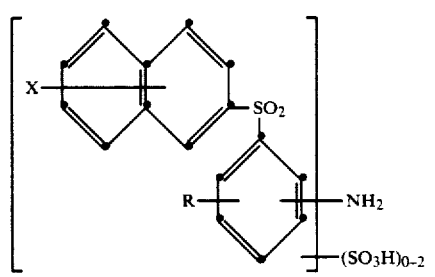

(9)

and coupling the diazonium compound to a coupling component of the formula (5).

Representative examples of the wide range of coupling components are: aniline, dimethylaniline, diethylaniline, 3-methyldimethylaniline, 3-methyldibutylaniline, 3-methyldiethylaniline, 3-acetylaminodimethylaniline, 3-methoxycarbonylaminodimethylaniline, 3-ureidodimethylaniline, 3-methyl-6-methoxydiethylaniline, 3-methyl-N-ethyl-N-butylaniline, 2,5-dimethoxydiethylaniline, N-ethyl-N-benzylaniline, N-ethyl-N-(β-cyanoethyl)-aniline, N-ethyl-N-(β-hydroxyethyl)-aniline, N-ethyl-N-(β-acetoxyethyl)-aniline, N,N-dibutylaniline, 3-acetylamino-N,N-diethylaniline, N-methyl-N-(β-cyanoethyl)-aniline, 3-methyl-N,N-di-(β-cyanoethyl)-aniline, 3-chloro-N,N-dimethylaniline, 3-methyl-N-ethyl-N-benzylaniline, N,N-di-n-propylaniline, 3-acetylamino-N,N-di-(β-hydroxyethyl)-aniline, 3-methyl-N,N-di-(β-acetoxyethyl)-aniline, 3-methyl-N-ethyl-N-(3'-sulfobenzyl)-aniline, N-ethyl-N-(β-chloroethyl)-aniline, 2-methoxy-5-acetylamino-N-benzylaniline, 2-methoxy-5-acetylamino-N-(β-acetoxyethyl)-N-benzylaniline, 3-methyl-N,N-dibutylaniline, 3-methyl-N-ethyl-N-(β-cyanoethyl)-aniline, 2-methyl-5-acetylamino-N,N-dimethylaniline, 2-chloro-5-acetylamino-N,N-dimethylaniline, 2-chloro-5-acetylamino-N-(γ-phenoxy-β-hydroxy-n-propyl)-aniline, 3-ureidoaniline, N-ethyl-N-(β-hydroxyethyl)-aniline, N-ethyl-N-(3'-sulfobenzyl)-aniline, 3-methyl-N-ethyl-(β-sulfoethyl)-aniline, 3-benzoylamino-N,N-diethylaniline, 3-(p-tolylsulfamoyl)-N,N-diethylaniline, 3-(p-chlorobenzoylamino)-N,N-diethylaniline, 3-methoxy-N,N-diethylaniline, 3-methyl-N,N-di-(β-hydroxyethyl)aniline, 3-methyl-6-methoxy-N,N-di(β-hydroxyethyl)-aniline, 3-acetylaminoaniline, 3-methyl-N-ethyl-N-phenethylaniline, N,N-di-(β-cyano- or hydroxyethyl)-aniline, 3-acetylamino-N,N-di-(β-cyanoethyl)-aniline, 3-methyl-N-ethyl-N-(β-hydroxyethyl)-aniline, 3-methyl-N-ethyl-N-(β-hydroxyethyl)-aniline, N-(β-cyanoethyl)-aniline, N-methyl-N-benzylaniline, phenol, 3-methylphenol, methoxybenzene, 3-ethoxytoluene, 1-hydroxy-4-methoxybenzene, 1-hydroxy-4-tert.-butylbenzene, 1-hydroxy-7-amino-3-sulfonaphthalene, 1-hydroxy-7-methylaminosulfonaphthaline, 7-phenylamino-3-sulfonaphthalene, 2-aminonaphthalene, 2-amino-6-sulfonaphthalene, 2-amino-5-acetylaminomethylnaphthalene, β-naphthol, 2-amino-5-methylaminosulfonylnaphthalene, 1-hydroxy-8-amino-3,6-disulfonaphthalene, 1-hydroxy-8-amino-3,5-disulfonaphthalene, 1-hydroxy-8-benzoylamino-3,6-disulfonaphthalene, 1-hydroxy-8-benzoylamino-3,5-disulfonaphthalene, 1-hydroxy-8-ureido-3,6-disulfonaphthalene, 1-hydroxy-8-ureido-3,5-disulfonaphthalene, 1-hydroxy-8-acetylamino-3,6-disulfonaphthalene, 1-hydroxy-8-ureido-3,5-disulfonaphthalene, 1-(3'-chlorophenyl)-3-methylpyrazol-5-one, 1-(2'-chloro-6'-methylphenyl)-3-methylpyrazol-5-one, 1-phenyl-3-methylpyrazol-5-one, 1-(2',3'- or 4'-sulfophenyl)-3-methylpyrazol-5-one, 1-(2'-chloro-4'- or 5',-sulfophenyl)-3-methylpyrazol-5-one, 1-(3'- or 4'-dibromopropionylamino)-benzoylamino-8-hydroxy-3,6-disulfonaphthalene, 1-(3'-or 4'-dibromopropionylamino)-benzoylamino-8-hydroxy-4,6-disulfonaphthalene, 2-α,β-dibromopropionylamino-1-hydroxy-6-sulfonaphthalene, 3-α,β-dibromopropionyl-N-methylamino-8-hydroxy-6-sulfonaphthalene, 1-[3'-(2''',4''-difluoro-5'-chloropyrimidylamino)-benzoylamino]-8-hydroxy-4,6-disulfonaphthalene, 1-(2'-methyl-4'-sulfophenyl)-3-methylpyrazol-5-one, 1-[4',8'-disulfonaphth-2-yl]-3-methylpyrazol-5-one, 1-[5',7'-disulfonaphthal-2-ene]-3-methylpyrazol-5-one, 1-(2'-chloro-5'-sulfophenyl)-3-methyl-5-aminopyrazole, 1-(2'-chloro-4'-sulfophenyl)-3-methyl-5-aminopyrazole, 1-(3'- or 4'-sulfophenyl)-3-methyl-5-aminopyrazole, 1-ethyl-3-cyano-4-methyl-6-hydroxypyrid-2-one, 1-ethyl-3-carbamoyl-4-methyl-6-hydroxypyrid-2-one, 1-ethyl-4-methyl-6-hydroxypyrid-2-one, 1-ethyl-4-methyl-3-methylsulfonyl-6-hydroxypyrid-2-one, 2-methylindole, 2-phenylindole, 1-methyl-2-phenylindole, 1-octyl-2-methylindole, 2,4,6-triaminopyrimidine, N-methyl-N,N-diphenylamine, acetoacetanilide, 1-(4'-methylphenyl)-3-methylpyrazol-5-one, 1-ethyl-2-methylindole, 1-phenyl-3-methyl-5-aminopyrazole, 7-amino-2,5-dimethylpyrazol[2,3-a]pyrimidine, 1-methoxynaphthalene, 1-hydroxy-4-sulfonaphthalene, 1-(2'-chlorophenylamino)-9-hydroxy-2-methyl-1H-naphtho(1,2-d)imidazole-7-sulfonic acid, 1-(2'-chlorophenylamino)-9-hydroxy-2-pentyl-1H-naphtho(1,2-d)imidazole-7-sulfonic acid, N-methyl-1,2,3,4-tetrahydroquinoline, N-ethyl-1,2,3,4-tetrahydroquinoline, 3-methyl-N-ethyl-N-propylaniline.

The present invention further relates to the diazo components of the formula (4)

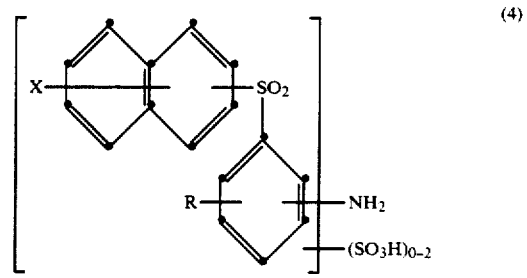

(4)

wherein R is hydrogen, halogen, carboxy, a $C_1$–$C_6$alkyl, $C_1$–$C_6$alkoxy, $C_2$–$C_6$alkanoylamino, $C_1$–$C_6$alkylsulfonylamino, $C_1$–$C_6$alkylsulfonyl, phenyl-$C_1$–$C_4$alkylsulfonyl or naphthyl-$C_1$–$C_4$alkylsulfonyl or benzoyl radical, which radicals may be further substituted, or is a

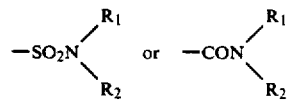

group, wherein each of $R_1$ and $R_2$ independently of the other is hydrogen, a $C_1$–$C_6$alkyl, $C_5$–$C_7$cycloalkyl, phenyl or naphthyl radical, which radicals may be further substituted, and wherein X is hydrogen, halogen or a $C_1$–$C_6$alkyl, $C_1$–$C_6$alkoxy, $C_2$–$C_6$alkanoylamino or $C_1$–$C_7$alkylsulfonylamino radical, which radicals may be further substituted.

Preferred compounds of formula (4) are those wherein (a) the —$NH_2$ group is linked to the phenyl ring in the ortho- or para-position to the —$SO_2$ group, and (b) X is hydrogen or $C_1$–$C_4$alkanoylamino.

Particularly preferred compounds of the formula (4) are those wherein R is hydrogen, chlorine, methyl, methoxy, carboxy, trifluoromethyl, acetamido, $C_1$–$C_2$alkylsulfonyl, a

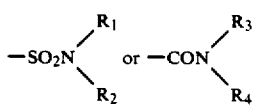

group, wherein $R_1$ is hydrogen or methyl, $R_2$ is hydrogen, $C_1$–$C_2$alkyl, cyclohexyl, β-hydroxyethyl, β-sulfoethyl, sulfophenyl which may be substituted by methyl, methoxy, chlorine, acetamido and carboxy, or is disulfophenyl, and mono- and disulfonaphthyl, $R_3$ is hydrogen or methyl and $R_4$ is hydrogen, methyl, $\beta$-sulfoethyl or sulfophenyl, or is a benzoyl radical which is substituted in the benzene nucleus by sulfo and may be further substituted by chlorine or methyl, and X is hydrogen or acetamido.

The preferred meaning of X is hydrogen. The radical R is linked to the phenyl ring preferably in the ortho- or para-position to the —$SO_2$ group.

Also preferred are the compounds of the formula

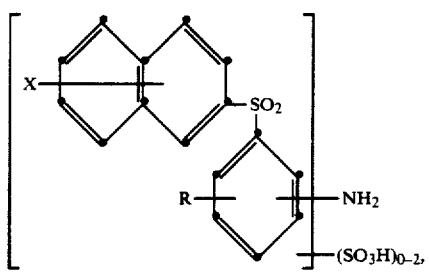

(6)

wherein R and X have the given meanings.

Particularly preferred are the compounds of the formula

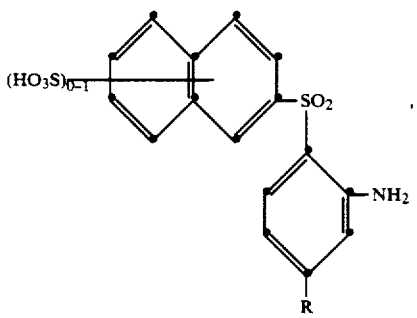

(7)

wherein R is chlorine, trifluoromethyl, sulfo or —$SO_2NH_2$, which compounds contain not more than 1 sulfo group.

The compounds of the formula (4) are prepared by reacting a compound of the formula

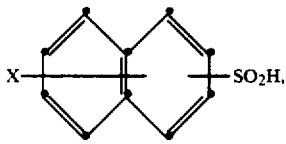

(10)

wherein X is as defined for formula (4), with a compound of the formula

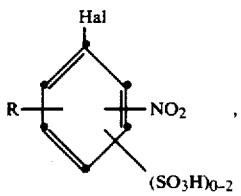

(11)

wherein Hal is halogen and R is as defined for formula (4), if desired sulfonating the reaction product and reducing the nitro group to the amino group.

The compounds of the formulae (10) and (11) are known per se and can be obtained by known methods.

The methods of preparing the compounds of the formula (4) are known per se. The reactions are carried out in the temperature range from 0° to 150° C., optionally under pressure, in aqueous solution or in mixtures of organic solvents, e.g. acetone and water, and in the pH range from 7 to 10. The reduction of the nitro group is also carried out by methods which are known per se, e.g. in glacial acetic acid in the presence of iron powder. The introduction of the sulfonic acid groups is carried out by methods which are known per se, e.g. in 25% oleum in the temperature range from 0° to 100° C.

Representative examples of starting materials of the formula (11) are: 4-chloro-3-nitrophenylethylsulfone, 4-chloro-3-nitrobenzene-1-sulfamide, 4-chloro-3-nitrobenzamide, 1,2-dichloro-3-nitrobenzene, 4,4'-dichloro-3-nitrobenzophenone, p-nitrochlorobenzene, 1,4-dichloro-2-nitrobenzene, o-nitrochlorobenzene, N,N-dimethyl 4-chloro-3-nitrobenzenesulfonamide, N-methyl 4-chloro-3-nitrobenzene-1-sulfonamide, N,N-diethyl 4-chloro-3-nitrobenzene-1-sulfonamide, N-ethyl, N-propyl, N-isopropyl, N-butyl, N-sec-butyl, N-isobutyl, N-tert-butyl, N-pentyl, N-hexyl or N-cyclohexyl 4-chloro-3-nitrobenzene-1-sulfonamide, N-methyl-N-cyclohexyl 4-chloro-3-nitrobenzene-1-sulfonamide, N-$\beta$-hydroxyethyl or N-$\beta$-methoxyethyl 4-chloro-3-nitrobenzene-1-sulfonamide, N-methyl-N-$\beta$-hydroxyethyl 4-chloro-3-nitrobenzene-1-sulfonamide, N-methyl, N-ethyl, N-propyl or N-butyl 4-chloro-3-nitrobenzamide, N,N-dimethyl, N,N-diethyl, N,N-dipropyl or N,N-diisopropyl 4-chloro-3-nitrobenzamide, N-methyl-N-cyclohexyl 4-chloro-3-nitrobenzamide, 4-chloro-3-nitrobenzylsulfone, 4-chloro-3-nitrophenylmethylsulfone, 4-chloro-3-nitrobenzophenone, 4-chloro-3-nitro-1-trifluoromethylbenzene, 4-chloro-3-nitrotoluene, 4-chloro-3-nitrobenzoic acid, 4-chloro-3-nitrobenzenesulfonic acid, 2-nitro-5-chlorobenzenesulfonic acid, N-p-sulfophenyl 4-chloro-3-nitrobenzamide, 4-chloro-3-nitro-4'-methyl-3'-sulfobenzophenone, N-$\beta$-sulfoethyl 4-chloro-3-nitrobenzenesulfonamide, N-methyl-N-$\beta$-sulfoethyl 4-chloro-3-nitrobenzenesulfonamide, N-(o- or m-sulfo)phenyl 4-chloro-3-nitrobenzenesulfonamide, n-(2-carboxy-4-sulfo)phenyl 4-chloro-3-nitrobenzenesulfonamide, N-(4-acetamido-3-sulfo)-phenyl 4-chloro-3-nitrobenzenesulfonamide, N-(2-chloro- or 2-methyl- or 2-methoxy-4- or -5-sulfo)phenyl 4-chloro-3-nitrobenzenesulfonamide, N-(2,5-disulfo)-phenyl 4-chloro-3-nitrobenzenesulfonamide, N-1-sulfo- or 1,5-disulfo-2-naphthyl 4-chloro-3-nitrobenzenesulfonamide, 4-chloro-3-nitro-4'-chloro-3'-sulfobenzophenone, N-(o- or m-sulfo)phenyl 4-chloro-3-nitrobenzamide, N-$\beta$-sulfoethyl 4-chloro-3-nitrobenzamide, N-methyl-N-$\beta$-sulfoethyl 4-chloro-3-nitrobenzamide, 2-nitro-5-chlorobenzenesulfonic acid, 4-acetamido-2-nitro-1-chlorobenzene, 4-chloro-3-nitrotoluene, 4-chloro-3-nitrobenzamide.

Typical examples of compounds of the formula (10) are: naphthalene-1-sulfinic acid, naphthalene-2-sulfinic acid, 6-acetamidonaphthalene-2-sulfinic acid.

Representative examples of compounds of the formula (4) are: 3-amino-4-(2-naphthylsulfonyl)-phenylsulfonic acid, 2-amino-5-(2-naphthylsulfonyl)-phenylsulfonic acid, 2-(4-aminophenylsulfonyl)-naphthalenesulfonic acid, 2-(2-amino-5-chlorophenylsulfonyl)-naphthalenesulfonic acid, 3-amine-4-(2-naphthylsulfonyl)-phenylsulfonamide, N-(4-sulfo)-phenyl-3-amino-4-(2-naphthylsulfonyl)-phenylcarbonamide, 3-amino-4-(2-naphthylsulfonyl)-3'-sulfo-4'-methylbenzophenone, 3-amino-4-(1-naphthylsulfonyl)-phenylsulfonic acid, 2-(2-amino-4-trifluoromethylphenylsulfonyl)-naphthalenedisulfonic acid, 2-(2-amino-4-chlorophenylsulfonyl)-naphthalenesulfonic acid, 4-(2-naphthylsulfonyl)-aniline, N-β-sulfoethyl- or N-methyl-N-β-sulfoethyl-3-amino-4-(2-naphthylsulfonyl)-phenylsulfonamide, N-(o-, m- or p-sulfophenyl)-3-amino-4-(2-naphthylsulfonyl)-phenylsulfonamide, N-(2-carboxy-4-sulfo)-phenyl-, N-(4-acetamido-3-sulfo)-phenyl-, N-(2-chloro-5-sulfo)-phenyl-, N-(2-methyl-4-sulfo)-phenyl- or N-(2-methoxy-5-sulfo)-phenyl-3-amino-4-(2-naphthylsulfonyl)-phenylsulfonamide, N-(2,5-disulfophenyl)-3-amino-4-(2-naphthylsulfonyl)-phenylsulfonamide, N-(1-sulfonaphthyl)-3-amino-4-(2-naphthylsulfonyl)-phenylsulfonamide, N-(1,5-disulfo)-2-naphthyl-3-amino-4-(2-naphthylsulfonyl)-phenylsulfonamide, 3-amino-4-(2-naphthylsulfonyl)-3'-sulfo-4'-chlorobenzophenone, N-(o-, m- or p-sulfophenyl)-3-amino-4-(2-naphthylsulfonyl)-phenylcarbonamide, N-β-sulfoethyl or N-methyl-N-β-sulfoethyl-3-amino-4-(2-naphthylsulfonyl)-phenylcarbonamide, 2-amino-5-(2-naphthylsulfonyl)-phenylsulfonic acid, 3-chloro-2-(2-naphthylsulfonyl)-aniline, N-methyl-, N,N-dimethyl-, N-methyl-N-β-hydroxyethyl- or N-methyl-N-cyclohexyl-3-amino-4-(2-naphthylsulfonyl)-phenylsulfonamide, 2-(2-naphthylsulfonyl)-5-(methylsulfonyl or ethylsulfonyl)-aniline, 3-chloro-4-(2-naphthylsulfonyl)-aniline, 2-trifluoromethyl-4-(2-naphthylsulfonyl)-aniline, 2-(2-naphthylsulfonyl)-5-methylaniline, 2-(2-amino-4-methylphenylsulfonyl)-naphthalenesulfonic acid, 2-(4-amino-3-methoxyphenylsulfonyl)-naphthalenesulfonic acid, 2-(2-amino-4-sulfamoylphenylsulfonyl)-naphthalenesulfonic acid, N-methyl-, N,N-dimethyl-, N-ethyl-, N-β-hydroxyethyl-, N-methyl-N-β-hydroxyethyl-, N-cyclohexyl-, N-β-sulfoethyl- or N-p-sulfophenyl-3-amino-4-(2-mono- or disulfonaphthylsulfonyl)-phenylsulfonamide, 2-(2-mono- or disulfonaphthylsulfonyl)-5-carboxyaniline, 2-(6-acetamido-2-naphthylsulfonyl)-5-sulfoaniline, and the corresponding (1-naphthylsulfonyl)-aniline compounds.

The dyes of formula (1) are obtained either in the form of the free sulfonic acid or, preferably, of the salts thereof. Examples of suitable salts are the alkali metal salts, alkaline earth metal salts or ammonium salts, or the salts of an organic amine. Typical examples are the sodium, lithium, potassium or ammonium salts or the triethanolamine salt.

The dyes of formula (1) are suitable for dyeing and printing materials which contain amide groups, for example textile fibres, textile filaments and wovens made from wool, silk, and polyurethane, and especially for dyeing and printing synthetic polyamide, using conventional dyeing methods. The dyes have brilliance and colour strength, very good exhaust and build-up properties, and give level dyeings of good general fastness properties such as fastness to rubbing, acid and alkali, and wetfastness, especially fastness to washing, water, hot water, and perspiration. To be singled out for special mention is their very good lightfastness and very good resistance to formaldehyde.

The invention is illustrated by the following Examples, in which parts are by weight. The relationship between parts by weight and parts by volume is the same as that between the gram and the cubic centimeter.

EXAMPLE 1

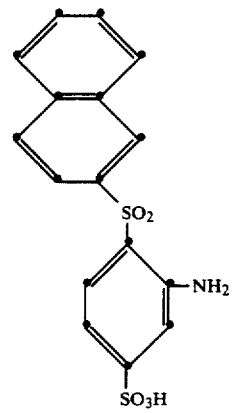

120.5 g of the sodium salt of naphthalene-2-sulfonic acid (95.5%) are suspended in 188 ml of dimethylformamide and to the suspension are added 39 ml of thionyl chloride. The solution is stirred for 10 minutes and then poured onto ice. After a time the precipitate is isolated by filtration, washed with ice-water and dried in a desiccator over phosphorus pentoxide. Yield: 114.9 g of acid chloride with a melting point of 73°–74° C.

85 ml of 40% sodium bisulfite solution are diluted with 260 ml of water and the pH is adjusted to 7–8 with concentrated NaOH while simultaneously heating to 75° C. With good stirring, 90.6 g of the above acid chloride are added over 1 hour, while keeping the pH at 7–8 at the same temperature. Stirring is continued for 1 hour at 80°–85° C., then the solution is clarified by filtration and the sulfinic acid is salted out with sodium chloride. The precipitate is isolated by filtration, washed with sodium chloride solution and dried in a vacuum cabinet at 60°–70° C. Yield: 102.3 g of the sodium salt of sulfinic acid.

99.2 g (58.9%) of this compound and 82.8 g of 4-chloro-3-nitrobenzene-1-sulfonic acid (85.9%) are suspended in 250 ml of water and the pH of the suspension is adjusted to 8 with dilute NaOH. After 15 hours at 112°–115° C. in a tantalium autoclave, the slurry is filtered and the filter cake is washed with sodium chloride solution and dried in vacuo at 60°–70° C. 129 g of the above nitro compound are added to 300 ml of water containing 60 g of iron powder and 3 ml of glacial acetic acid. The batch is refluxed for 20 minutes, then 4.8 g of sodium carbonate are added cautiously and iron residue is removed by filtration. The product is precipitated with sodium chloride and the precipitate is isolated by filtration, washed with sodium chloride solution and dried in vacuo at 60°–70° C. The yield of the chromatographically pure compound of the above formula is 126.4 g.

EXAMPLE 2

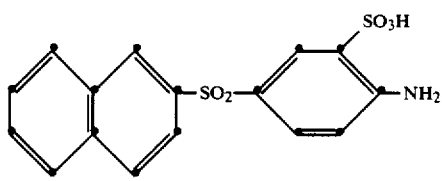

96.3 g of naphthalene-2-sulfinic acid, Na-salt (59.7%), obtained in Example 1, and 47.25 g of 1-chloro-4-nitrobenzene are stirred in 150 ml of dimethylsulfoxide and the mixture is heated to 102° C. After 1½ hours, the turbid solution is diluted with 150 ml of alcohol and 300 ml of water. The precipitate is collected by filtration, washed with water and methanol, and dried in vacuo at 60°-70° C., affording 77.7 g of a compound with a melting point of 142°-145° C.

31.3 g of this nitro compound are catalytically reduced with Raney nickel in 100 ml of dimethylformamide. After removal of the catalyst, the solution is poured into water and the precipitate is isolated by filtration, washed with water and dried in vacuo at 60°-70° C., affording 27.3 g of amino compound with a melting point of 188°-191° C.

With stirring, 26.8 g of this component are mixed with 150 ml of tetrachloroethane and 7.25 ml of chlorosulfonic acid. The suspension is heated with a bath of 160° C. and refluxed for 6 hours, and then filtered. The filter residue is washed with chloroform and dissolved in water at pH 7 with the addition of NaOH. Any solvent residues still present are removed and the aqueous solution is clarified by filtration using activated carbon. The compound of the above formula is precipitated with concentrated hydrochloric acid. The precipitate is isolated by filtration, washed with water and dried in vacuo at 60°-70° C. Yield: 22.9 g.

EXAMPLE 3

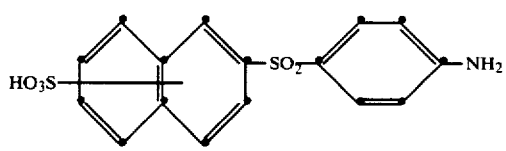

40.3 g of 4-nitrophenyl-2-naphthylsulfone obtained in Example 2 are monosulfonated at room temperature with 100 ml of 10% oleum. The mixture of isomers is poured onto ice and neutralised with concentrated NaOH. The precipitate is isolated by filtration and washed, then added to 200 ml of water containing 24 g of iron powder and 2 ml of glacial acetic acid, and reduction is carried out at boiling temperature. After the careful addition of 3.9 g of sodium carbonate, the iron residue is removed by filtration and the amine is precipitated from the clear filtrate with concentrated hydrochloric acid. The precipitate is isolated by filtration and washed, then dried in vacuo at 60°-70° C., affording 39.9 g of a greyish white powder.

EXAMPLE 4

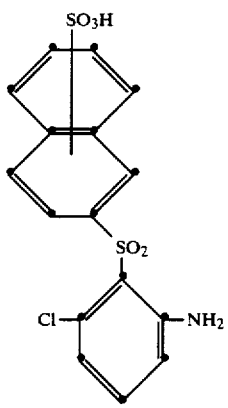

96.3 g of naphthalene-2-sulfinic acid, Na-salt (59.7%), obtained in Example 1, and 57.6 g of 1,2-dichloro-3-nitrobenzene are stirred for 2 hours at 90°-95° C. in 150 ml of dimethylsulfoxide. Then 150 ml of alcohol and 300 ml of water are added and the slurry so obtained is filtered. The filter cake is washed and dried in vacuo at 60°-70° C., affording 88.2 g of a compound with a melting point of 159°-169° C. 87 g of the above compound are sulfonated in 200 ml of 10% oleum. The solution is poured onto ice and left to stand for a time. The sulfuric acid solution is decanted and the residue is dissolved in water and the pH of the solution is adjusted to 10 with KOH. The pure monosulfonic acid is precipitated with potassium chloride and the precipitate is isolated by filtration and washed.

134 g of the paste so obtained are added to 200 ml of water containing 32 g of iron powder and 2 ml of glacial acetic acid. The batch is stirred for 30 minutes at boiling temperature, then 4 g of sodium carbonate are cautiously added and the iron residue is removed by filtration. The amine is precipitated with concentrated hydrochloric acid and the precipitate is isolated by filtration and dried in vacuo at 60°-70° C. Yield: 46 g of the compound of the above formula.

EXAMPLE 5

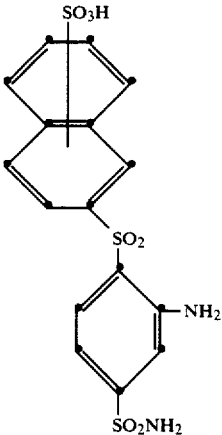

94.6 g of naphthalene-2-sulfinic acid, Na-salt (61%), obtained in Example 1, 70.95 g of 4-chloro-3-nitrobenzene-1-sulfonamide and 12.3 g of calcined sodium acetate are stirred in 150 ml of dimethylsulfoxide and the mixture is heated to 50° C. After 3 hours, the reaction mixture is diluted with 150 ml of alcohol and 450 ml of water. The precipitate is isolated by filtration, washed, and dried in vacuo at 60°-70° C., affording 101.6 g of a compound with a melting point of 169°-173° C.

94.6 g of this powder are sulfonated in 192 ml of 10% oleum. The product is precipitated by pouring the reaction mixture onto ice and isolated by filtration. The filter cake is dissolved in hot water at pH 7-10 and the product is salted out with sodium chloride. The precipitate is isolated by filtration and washed. The filter cake is then added to 300 ml of water containing 40 g of iron powder and 3 ml of glacial acetic acid and reduced to the amine at boiling temperature. 3.6 g of sodium carbonate are then cautiously added and the iron residue is removed by filtration. The compound of the above formula is precipitated with potassium chloride, isolated by filtration, washed, and dried in vacuo at 60°-70° C. Yield: 91.8 g.

EXAMPLE 6

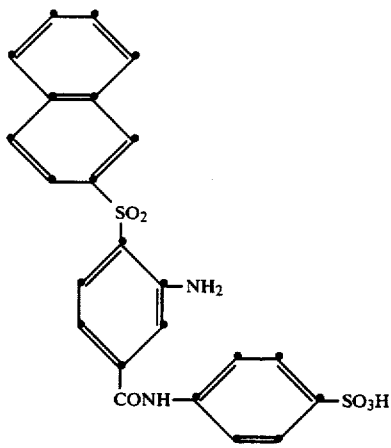

With stirring, 87.5 g of 99% sulfanilic acid in 500 ml of water are adjusted to pH 7-8 with concentrated NaOH and the solution is cooled to 5° C., whereupon 106.2 g of 4-chloro-3-nitrobenzoyl chloride in 100 ml of acetone are added dropwise. The batch is stirred for a time at pH 7 and the carboxamide is then precipitated with sodium chloride. The precipitate is isolated by filtration, washed and dried in vacuo at 60°-70° C. Yield: 163 g.

38.6 g of naphthalene-2-sulfinic acid, Na-salt (59.7%), obtained in Example 1, and 44.9 g of the above compound are refluxed for several hours in 250 ml of water. The crystalline precipitate is filtered off cold and dried in vacuo at 60°-70° C. Yield: 53.7 g. The powder so obtained is added to 300 ml of water containing 20 g of iron powder and 7 ml of glacial acetic acid, and reduced at the boil. Then 9.1 g of sodium carbonate are added cautiously and the iron residue is removed by filtration. The product is filtered cold with suction, washed, and dried in vacuo at 60°-70° C., affording 47 g of the compound of the above formula.

EXAMPLE 7

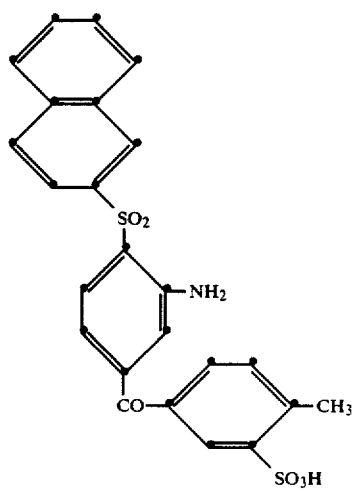

138 g of 1-chloro-2-nitro-4'-methylbenzophenone are sulfonated in 450 ml of 25% oleum at 20°-48° C. The reaction mixture is poured onto ice and the product is precipitated with sodium chloride and isolated by filtration. The filter cake is dissolved in water and the product salted out with potassium chloride. The precipitate is filtered with suction and washed and dried in vacuo at 60°-70° C. Yield: 221.9 g. A mixture of 35.4 g of naphthalene-2-sulfinic acid, Na-salt (59.7%), obtained as described in Example 1, and 59.8 g of the above compound in 300 ml of water is adjusted to pH 8 and kept for several hours at boiling temperature. The sulfone derivative precipitates cold and is added in the form of the moist filter cake to 250 ml of water containing 20 g of iron powder and 2 ml of glacial acetic acid. Reduction to the amine is carried out at reflux temperature. After the cautious addition of 3.3 g of sodium carbonate, the iron residue is removed by filtration and the product is precipitated from the filtrate with sodium chloride. The precipitate is isolated by filtration, washed, and dried in vacuo at 60°-70° C., affording 50.2 g of the compound of the above formula.

EXAMPLE 8

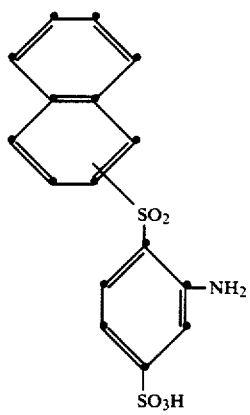

83.7 g of the compound of the above formula are obtained using 153.3 g (67.6%) of a mixture of c. 45% naphthalene-2-sulfinic acid, Na-salt, and 55% naphthalene-1-sulfinic acid, Na-salt, and 82.8 g of 4-chloro-3-nitrobenzene-1-sulfonic acid, Na-Salt (85.9%), and carrying out the procedure of Example 1.

EXAMPLE 9

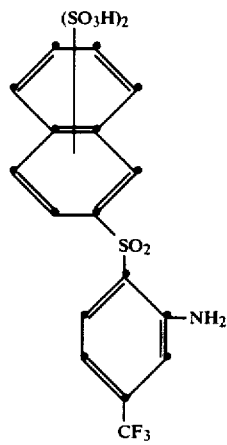

67.65 g of 4-chloro-3-nitrobenzotrifluoride and 97 g of naphthalene-2-sulfinic acid, Na-salt (62.4%), are reacted to the sulfone derivate under the same conditions as in Example 2. Yield: 113.5 g of powder with a melting point of 143°-144° C.

53.1 g of the above powder are disulfonated in 110 ml of 25% oleum and the product is isolated in the usual manner. The filter cake is suspended and neutralised in water, then added to 100 ml of water containing 25 g of iron powder and 20 ml of glacial acetic acid. Reduction to the amine is carried out at reflux temperature. After the cautious addition of 3.3 g of sodium carbonate, the iron residue is removed by filtration and the product is precipitated from the filtrate with sodium chloride. The precipitate is isolated by filtration, washed, and dried in vacuo at 60°-70° C., affording 67 g of the compound of the above formula.

EXAMPLE 10

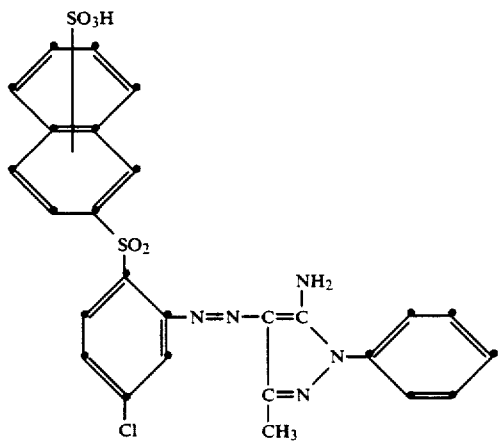

7.95 g of 4-chloro-2-aminophenyl sulfo-2-naphthylsulfone (prepared in corresponding manner to Examples 1-4) are dissolved neutral in 50 ml and to the solution are added 5 ml of 4N sodium nitrite. The solution is added dropwise to a mixture of 50 g of ice and 5 ml of hydrochloric acid and the resultant suspension is stirred for a time. A small excess of nitrite is destroyed with sulfamic acid.

Then a solution of 3.6 g of 3-methyl-1-phenyl-5-pyrazolimine (96.3%) in 25 ml of water and 3 ml of concentrated hydrochloric acid are added dropwise to the diazo suspension. When the coupling is complete, the dye is filtered with suction and washed. The filter cake is dissolved in water with NaOH at pH 9 and reprecipitated with sodium chloride. The precipitate is isolated by filtration, washed and dried in vacuo at 60°-70° C., affording 6.9 g of dye which colours polyamide material from a weakly acid bath in brilliant yellow shades. The dye has excellent build-up, very good lightfastness, and very good resistance to formaldehyde.

EXAMPLE 11

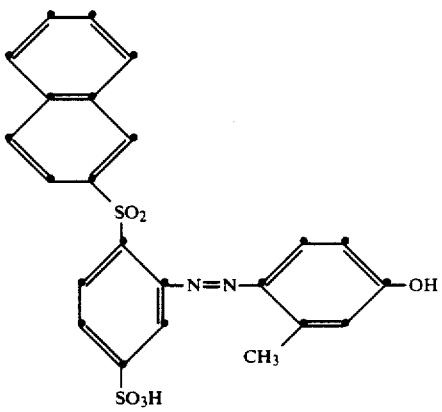

14.6 g of the compound of Example 1 (74.4%) are dissolved in 90 ml of water of 50° C. To this solution are added 7.5 ml of 4N sodium nitrite solution, while cooling with 45 g of ice to 17° C. Then 18 ml of α-naphthalenesulfonic acid solution are poured into the solution. A small excess of nitrite is destroyed after a time with sulfamic acid.

3.24 g of cresol are dissolved in 60 ml of water at pH 11 by adding NaOH. The solution is cooled to 2° C. and then the suspension of the diazonium salt is added dropwise over 25 minutes while keeping the pH at 8 with NaOH. The dye is precipitated at pH 8 with hydrochloric acid. The precipitate is isolated by filtration, washed with water and dried in vacuo at 60°-70° C. Yield: 15.52 g.

The dye colours polyamide material from a weakly acid bath in brilliant orange shades.

EXAMPLE 12

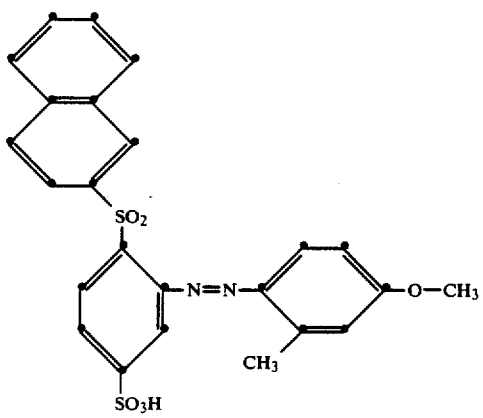

10.34 g of the dye of Example 11 are dissolved in 150 ml of water of 50°-55° C. Dimethyl sulfate is then added dropwise at this temperature, while keeping the pH at 10.5 with 2N NaOH, until chromatographic analysis shows that the etherification is complete. The dye is salted out with sodium chloride, isolated by filtration, washed with dilute sodium chloride solution and dried in vacuo at 60°-70° C., affording 8.65 g of dye which colours polyamide from a weakly acid bath in brilliant orange shades.

EXAMPLE 13

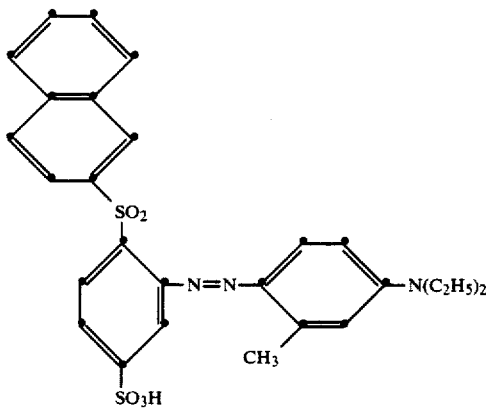

9.76 of the compound Example 1 are diazotised as in Example 11.

3.26 g of N,N-diethyl-m-toluidine are dissolved in 25 ml of water with 2.5 ml of concentrated hydrochloric acid and this solution is added to the diazo suspension. The pH is raised first with sodium acetate and then with 2N NaOH to pH 7, and the dye is salted out with sodium chloride. The precipitate is isolated by filtration, washed, and dried in vacuo at 60°-70° C., affording 5.8 g of a dye which colours polyamide material from a weakly acid bath in brilliant yellowish red shades. The dye has excellent build-up, excellent lightfastness, very good resistance to formaldehyde, and good wet fastness properties.

EXAMPLE 14

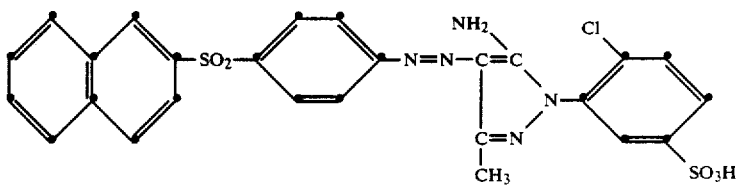

5.66 g of 4-aminophenyl-2-naphthylsulfone, prepared as intermediate in Example 2, are diazotised in 25 ml glacial acetic acid and 5 ml of concentrated hydrochloric acid with 5 ml of 4N sodium nitrite at room temperature. The diazo solution is diluted with 50 ml of water after a time and a small excess of nitrite is destroyed with sulfamic acid.

5.94 g of 2-chloro-5-sulfophenyl-3-methyl-5-pyrazolimine (96.7%) are dissolved neutral in 75 ml of water and the solution is cooled to 2° C. Then the above diazo solution is added at 2°-5° C. When the coupling is complete, the dye is salted out, isolated by filtration, and dried in vacuo at 60°-70° C., affording 10.2 g of a dye which colours polyamide material from a weakly acid bath in brilliant yellow shades. The dye has excellendt build-up and good general fastness properties.

EXAMPLE 15

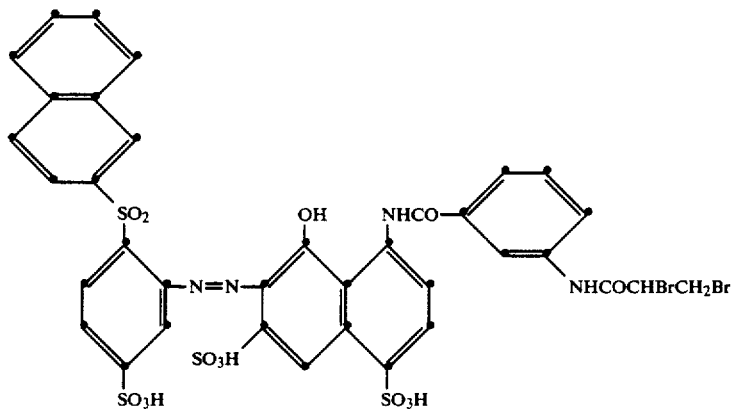

7.32 g of the compound of Example 1(74.4%) are diazotised as in Example 11.

17.74 g of 3-α, β-dibromopropionylaminobenzoyl K-acid (55.1%) are dissolved at ph 7 in 75 ml of water and the solution is cooled to 20° C. The diazo suspension is added dropwise, while simultaneously keeping the pH at 7 with NaOH. The dye is isolated by filtration and dried in vacuo at 60°–70° C., affording 15.3 of a dye which colours wool in red shades of good general fastness properties.

Valuable dyes with similarly good properties and which colour polyamide or wool in the indicated shades are also obtained by repeating the procedures of Examples 1 to 15, but using, as diazo component and coupling component, the compounds listed in the following tables. The formula

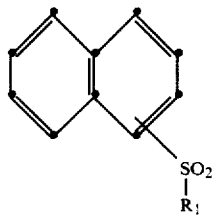

denotes that an appoximately 1:1 mixture of the diazo component which is substituted in the 1- and 1- and 2-position of the naphthalene ring is used.

TABLE 1

| Example | Diazo component $R_1$ | $R_2$ | Coupling component | Shade on polyamide |
|---|---|---|---|---|
| 1 | naphthalene-SO$_2$-R$_1$ with aniline NH$_2$/R$_2$ | —SO$_2$NHCH$_2$CH$_2$SO$_3$H | 3-methyl-N,N-diethylaniline | red |
| 2 | " | —SO$_2$N(CH$_3$)—CH$_2$CH$_2$SO$_3$H | " | " |
| 3 | " | —SO$_2$NH—C$_6$H$_3$(SO$_3$H)$_2$ (2,5-disulfo) | " | " |
| 4 | " | —SO$_2$NH—C$_6$H$_4$—SO$_3$H (3-sulfo) | " | " |
| 5 | " | —SO$_2$NH—C$_6$H$_4$—SO$_3$H (4-sulfo) | " | " |
| 6 | " | —SO$_2$NH—C$_6$H$_3$(SO$_3$H)(COOH) | " | " |

TABLE 1-continued

| | $\underset{SO_2-R_1}{\text{[naphthalene]}}$ | $\underset{R_2}{\text{[aniline with NH}_2\text{]}}$ | | |
|---|---|---|---|---|
| 7 | " | " | [NHCOCH₃, SO₃H substituted benzene with —SO₂NH—] | [N(C₂H₅)₂, CH₃ substituted benzene] | red |
| 8 | " | " | [SO₃H, Cl substituted benzene with —SO₂NH—] | " | " |
| 9 | " | " | [SO₃H, CH₃ substituted benzene with —SO₂NH—] | " | " |
| 10 | " | " | [SO₃H, OCH₃ substituted benzene with —SO₂NH—] | " | " |
| 11 | " | " | [SO₃H, SO₃H substituted benzene with —SO₂NH—] | " | " |

TABLE 1-continued

| | | | | | |
|---|---|---|---|---|---|
| 12 | naphthalene-SO₂—R₁ | aniline-R₂ (NH₂) | naphthalene with SO₃H and —SO₂NH— | | " |
| 13 | " | " | naphthalene with SO₃H, SO₃H, and —SO₂NH— | phenyl with N(C₂H₅)₂ and CH₃ | red |
| 14 | " | " | phenyl with SO₃H, CH₃, —CO— | | " |
| 15 | " | " | phenyl with SO₃H, Cl, —CO— | | " |
| 16 | " | " | phenyl with SO₃H, —CONH— | | yellowish red |
| 17 | " | " | phenyl with SO₃H, SO₃H, —CONH— | | " |

TABLE 1-continued
| | | | | | |
|---|---|---|---|---|---|
| 18 | 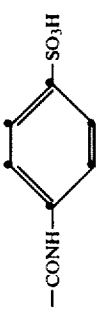 | 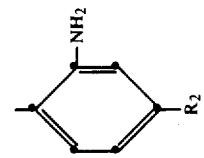 | " | —CONH— 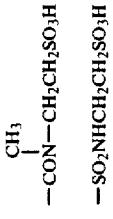 —SO₃H | " |
| 19 | " | " | " | —CONHCH₂CH₂SO₃H | yellowish red |
| 20 | " | " | " | $\overset{CH_3}{-CON-CH_2CH_2SO_3H}$ | " |
| 21 | 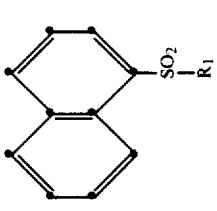 | " | " | —SO₂NHCH₂CH₂SO₃H | red |
| 22 | " | " | " | $\overset{CH_3}{-SO_2NCH_2CH_2SO_3H}$ | " |
| 23 | " | " | " | 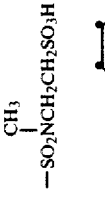 | " |
| 24 | " | " | " | 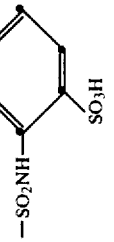 | " |

TABLE 1-continued

| | | | | red |
|---|---|---|---|---|
| 25 | naphthyl-SO₂-R₁ | aniline-NH₂/R₂ | -SO₂NH-C₆H₃(SO₃H) | N(C₂H₅)₂-C₆H₃-CH₃ |
| 26 | " | " | -SO₂NH-C₆H₃(SO₃H)(COOH) | " |
| 27 | " | " | -SO₂NH-C₆H₃(NHCOCH₃)(SO₃H) | " |
| 28 | " | " | -SO₂NH-C₆H₃(SO₃H)(Cl) | " |
| 29 | " | " | -SO₂NH-C₆H₃(SO₃H)(CH₃) | " |
| 30 | " | " | -SO₂NH-C₆H₃(SO₃H)(OCH₃) | " |

TABLE 1-continued

| | | | | |
|---|---|---|---|---|
| 31 | naphthalene-SO₂R₁ | phenyl-NH₂, R₂ | phenyl with SO₃H, —SO₂NH—, SO₃H and N(C₂H₅)₂, CH₃-phenyl | red |
| 32 | " | " | naphthalene —SO₂NH— | " |
| 33 | " | " | naphthalene with SO₃H, —SO₂NH— | " |
| 34 | " | " | phenyl with SO₃H, CH₃, —CO— | " |
| 35 | " | " | phenyl with SO₃H, Cl, —CO— | " |
| 36 | " | " | phenyl with —CONH—, SO₃H | yellowish red |

TABLE 1-continued

| | | | | |
|---|---|---|---|---|
| 37 | naphthalene-SO$_2$-R$_1$ | benzene-NH$_2$, R$_2$ | —CONH—(benzene)—SO$_3$H | —(benzene with CH$_3$)—N(C$_2$H$_5$)$_2$ | yellowish red |
| 38 | " | " | —CONH—(benzene)—SO$_3$H | " | " |
| 39 | " | " | —CONHCH$_2$CH$_2$SO$_3$H | " | " |
| 40 | " | " | —CON(CH$_3$)—CH$_2$CH$_2$SO$_3$H | " | " |
| 41 | " | " | —SO$_3$H | " | " |
| 42 | naphthalene-SO$_2$-R$_1$ | " | —SO$_2$NHCH$_2$CH$_2$SO$_3$H | " | red |
| 43 | " | " | —SO$_2$N(CH$_3$)CH$_2$CH$_2$SO$_3$H | " | " |
| 44 | naphthalene-SO$_2$-R$_1$ | benzene-NH$_2$, R$_2$ | —SO$_2$NH—(benzene)—SO$_3$H | —(benzene with CH$_3$)—N(C$_2$H$_5$)$_2$ | red |

TABLE 1-continued

| | | | |
|---|---|---|---|
| 45 | | —SO₂NH—⟨benzene⟩—SO₃H (1,3) | " | " |
| 46 | | —SO₂NH—⟨benzene⟩—SO₃H (1,4) | " | " |
| 47 | | —SO₂NH—⟨benzene⟩(COOH)(SO₃H) | " | " |
| 48 | | —SO₂NH—⟨benzene⟩(NHCOCH₃)(SO₃H) | " | " |
| 49 | | —SO₂NH—⟨benzene⟩(Cl)(SO₃H) | " | " |
| 50 | ⟨naphthalene⟩—SO₂—R₁ | —SO₂NH—⟨benzene⟩(CH₃)(SO₃H) | ⟨benzene⟩(CH₃)(N(C₂H₅)₂) | red | with NH₂ and R₂ substituents on the aniline ring shown in the R₂ column header region.

TABLE 1-continued
| 51 | 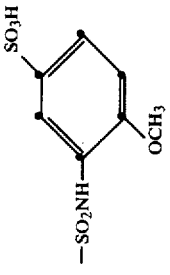 | ; | ; | ; |
| 52 | 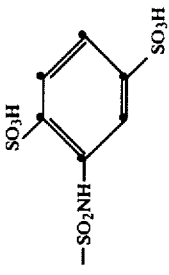 | ; | ; | ; |
| 53 | 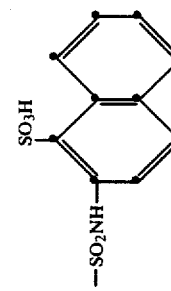 | ; | ; | ; |
| 54 | 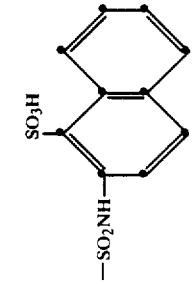 | ; | ; | ; |
| 55 | 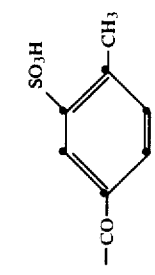 | ; | ; | ; |

TABLE 1-continued

| No. | ![naphthalene-SO2-R1] | ![aniline-R2 with NH2] | R2 group | Coupler | Color |
|---|---|---|---|---|---|
| 56 | " | " | ![2-Cl-5-SO3H-benzoyl: -CO-C6H3(Cl)(SO3H)] | ![3-methyl-4-N(C2H5)2-phenyl] | red |
| 57 | " | " | ![4-SO3H-2-CONH-phenyl] -CONH- | " | yellowish red |
| 58 | " | " | ![3-SO3H-phenyl-CONH] -CONH- | " | " |
| 59 | " | " | ![4-SO3H-phenyl-CONH] -CONH- | " | " |
| 60 | " | " | —CONHCH₂CH₂SO₃H | " | " |
| 61 | " | " | —CON(CH₃)—CH₂CH₂SO₃H | " | " |
| 62 | " | " | —SO₃H | " | " |

| Example | Diazo component | | | Coupling component | Shade on polyamide |
|---|---|---|---|---|---|
| | | $R_1$ | $R_2$ | | |
| 63 | naphthalene-SO$_2$-R$_1$ | (R$_2$-phenyl-NH$_2$) | —SO$_3$H | 3-methyl-N,N-diethylaniline | red |
| 64 | " | " | " | 1-phenyl-3-methyl-5-iminopyrazolidine type (NH=C–CH$_2$–N(Ph)–N=C–CH$_3$) | yellow |
| 65 | " | " | " | " | " |
| 66 | " | " | " | 3-methyl-N,N-diethylaniline | red |
| 67 | " | " | H | 3-sulfo-phenyl pyrazolone type | yellow |

| No. | Naphthalene-SO₂-R₁ | Aniline component | R₂ | Coupler | Color |
|---|---|---|---|---|---|
| 68 | naphthyl-SO₂-R₁ | R₂-C₆H₄-NH₂ | H | N(C₂H₅)(CH₂CH₂SO₃H)-C₆H₃(CH₃) | yellowish red |
| 69 | " | NH₂-C₆H₄-R₂ | " | pyrazolone with Cl-C₆H₃-SO₃H | yellow |
| 70 | " | " | " | pyrazolone with C₆H₄-SO₃H | " |
| 71 | " | " | " | N(C₂H₅)(CH₂CH₂SO₃H)-C₆H₃(CH₃) | yellowish red |
| 72 | " | " | " | 2-amino-8-hydroxynaphthalene-6-sulfonic acid | red |

-continued
| | | | |
|---|---|---|---|
| 73 | 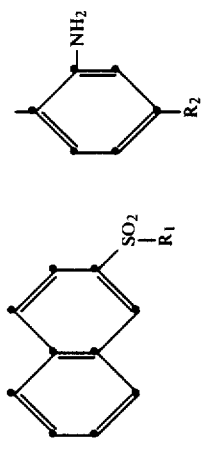 | H | 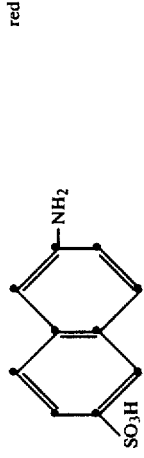 red |
| 74 | " | Cl | 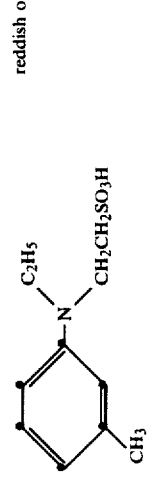 reddish orange |
| 75 | " | " | 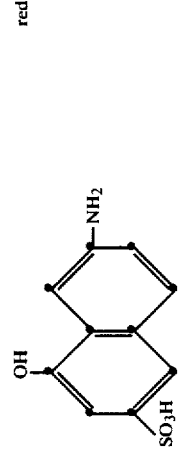 red |
| 76 | " | " | 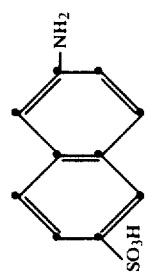 " |
| 77 | " | " | 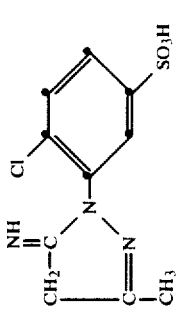 yellow |

| | -continued | | |
|---|---|---|---|
| 78 | naphthalene-SO₂-R₁ | —SO₃H | 4-N(C₂H₅)₂-2-CH₃-phenyl | red |
| 79 | " | " | phenyl-pyrazolone (NH, CH₂, C=N, C-CH₃) | yellow |
| 80 | " | " | " | " |
| 81 | " | H | 4-N(C₂H₅)₂-2-CH₃-phenyl | red |
| 82 | " | " | 3-SO₃H-phenyl-pyrazolone | yellow |

(Structures in R₁/R₂ columns: naphthyl-SO₂-R₁ with R₂/NH₂ aniline couplers as shown)

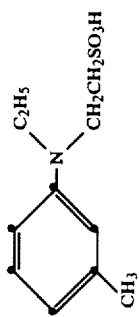

-continued
| | | | | |
|---|---|---|---|---|
| 88 | 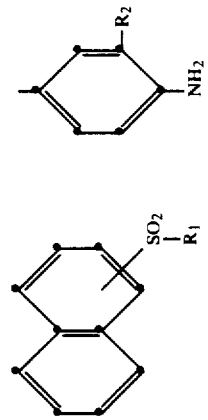 | 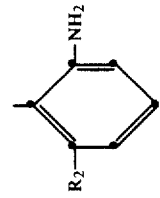 | H | 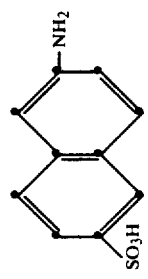 red |
| 89 | " | " | Cl | reddish orange |
| 92 | " | " | " | 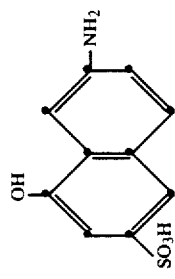 red |
| 91 | " | " | " | 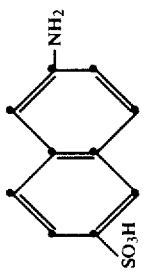 " |
| 92 | " | " | " | 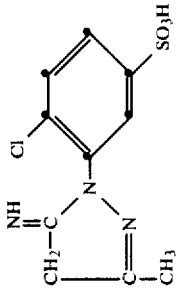 yellow |

-continued

| | ![SO2-R1 naphthalene] | ![NH2 phenyl R2] | R₁ | R₂ | color |
|---|---|---|---|---|---|
| 93 | " | " | Cl | ![N(C2H5)(CH2CH2SO3H) with tolyl CH3] | yellowish red |
| 94 | " | " | " | ![naphthalene with NH2, OH, HO3S] | red |
| 95 | " | " | —SO₂NH₂ | ![N(C2H5)(CH2CH2SO3H) with tolyl CH3] | yellowish red |
| 96 | " | " | " | ![naphthalene with NH2, OH, HO3S] | red |
| 97 | " | " | —SO₂NHCH₃ | ![N(C2H5)(CH2CH2SO3H) with tolyl CH3] | yellowish red |
| 98 | " | " | " | ![naphthalene with NH2, OH, HO3S] | red |

-continued
| | | | |
|---|---|---|---|
| 99 | $-SO_2N\begin{subarray}{c}CH_3\\CH_2CH_2OH\end{subarray}$ | " | 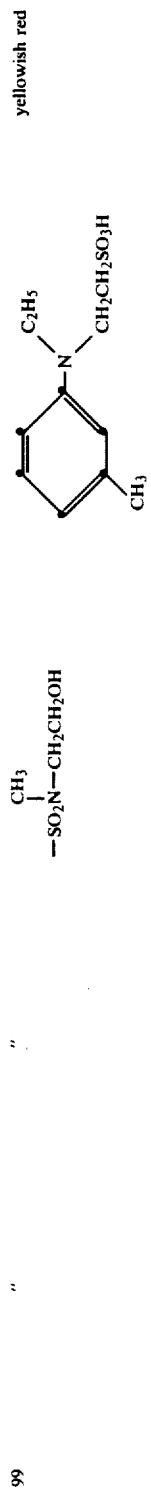 yellowish red |
| 100 | " | " | red |
| 101 |  | " | yellowish red |
| 102 | " | " | red |
| 103 | $-SO_2CH_3$ | 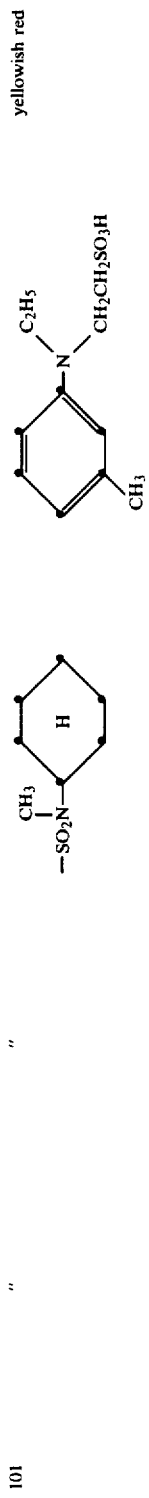 | 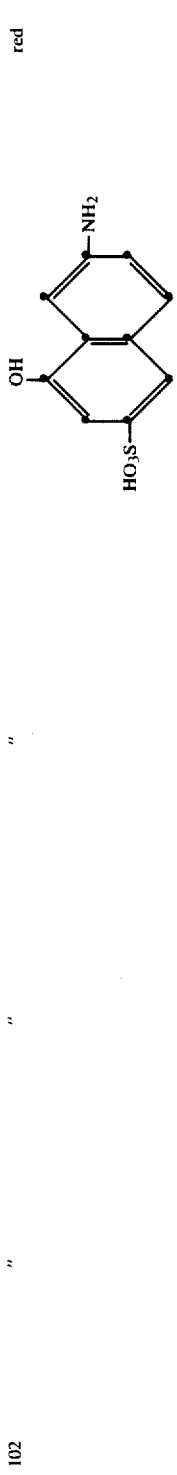 yellowish red |

| | | | |
|---|---|---|---|
| 104 | " | " | 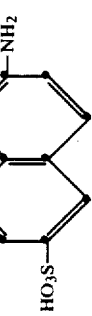 red |
| 105 | " | —SO₂C₂H₅ | 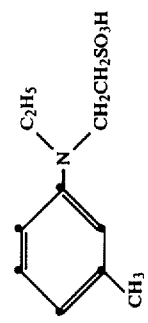 yellowish red |
| 106 | " | " | 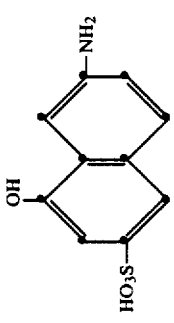 red |
| 107 | " | CF₃ | 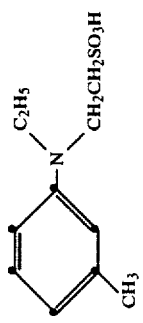 yellowish red |
| 108 | " | " | 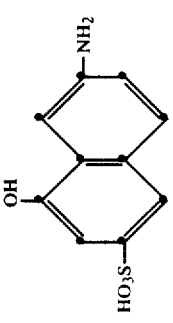 red |
| 109 | " | —CH₃ | 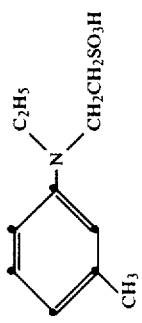 yellowish red |

-continued

| | | | |
|---|---|---|---|
| 110 | | (naphthol with OH, NH₂, HO₃S) / (aniline with N(C₂H₅)(CH₂CH₂SO₃H), CH₃) | red |
| 111 | —NHCOCH₃ | same naphthol / same aniline | yellowish red |
| 112 | " | same | red |
| 113 | —CONH₂ | same | yellowish red |
| 114 | " | same | red |
| 115 | —CONHCH₃ | same | yellowish red |

General structure:

naphthalene-SO₂—R₁ ... benzene-NH₂, R₂

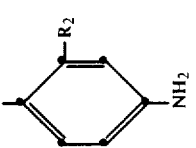

-continued

| No. | Structure 1 | R₂ | Coupler | Color |
|---|---|---|---|---|
| 121 | naphthalene-SO₂-R₁ with R₂, NH₂ on benzene | CF₃ | phenyl-N(C₂H₅)(CH₂CH₂SO₃H) with CH₃ | yellowish red |
| 122 | " | " | 6-amino-1-hydroxy-3-sulfonaphthalene (NH₂, OH, HO₃S) | red |
| 123 | naphthalene-SO₂-R₁ with NH₂, R₂ on benzene | Cl | phenyl-N(C₂H₅)(CH₂CH₂SO₃H) with CH₃ | yellowish red |
| 124 | " | " | 6-amino-1-hydroxy-3-sulfonaphthalene (NH₂, OH, HO₃S) | red |
| 125 | " | —SO₂NH₂ | phenyl-N(C₂H₅)(CH₂CH₂SO₃H) with CH₃ | yellowish red |

| | | | | |
|---|---|---|---|---|
| | | -continued | | |
| 126 | | " | 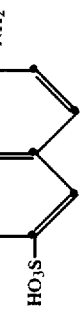 | red |
| 127 | | —SO$_2$NHCH$_3$ | 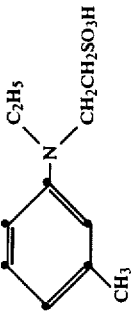 | yellowish red |
| 128 | | " | 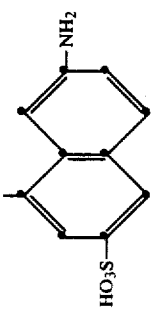 | red |
| 129 | 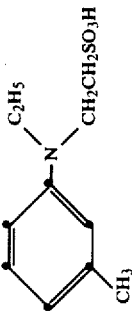 | —SO$_2$N(CH$_3$)—CH$_2$CH$_2$OH | 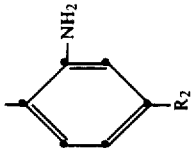 | yellowish red |
| 130 | | " | 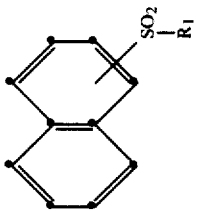 | red |
| 131 | | 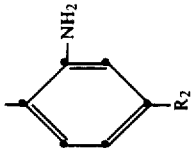 | 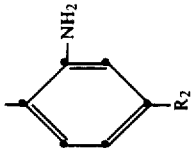 | yellowish red |
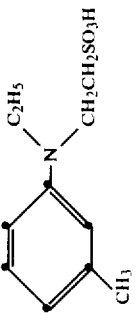

| | | | | |
|---|---|---|---|---|
| 132 | " | " | 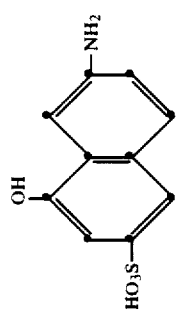 | red |
| 133 | " | —SO$_2$CH$_3$ | 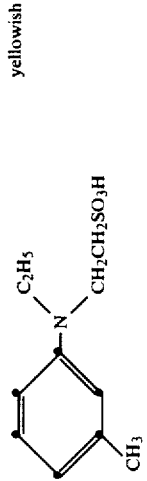 | yellowish red |
| 134 | " | " | 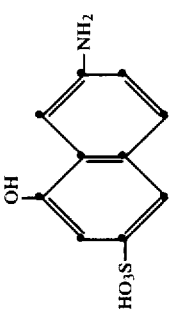 | red |
| 135 | " | —SO$_2$C$_2$H$_5$ | 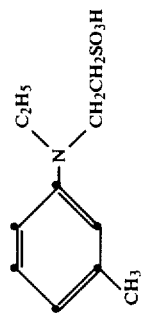 | yellowish red |
| 136 | " | " | 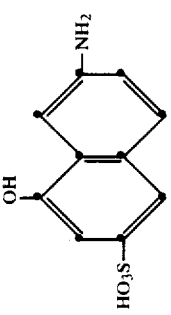 | red |
| 137 | " | —CF$_3$ | 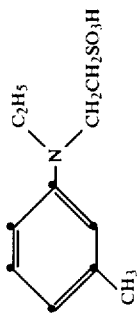 | yellowish red |

| 138 | 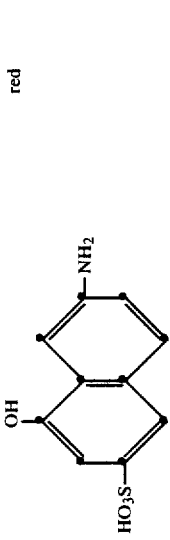 | red |

| Example | Diazo component | | Coupling component | Shade on polyamide |
|---|---|---|---|---|
| | R₁ | R₂ | | |
| 139 | [naphthalene-SO₂-R₁] / [aniline with NH₂ and R₂] | —CH₃ | N-ethyl-N-(2-sulfoethyl)-m-toluidine | yellowish red |
| 140 | " | " | 6-amino-1-hydroxy-3-sulfonaphthalene | red |
| 141 | " | —NHCOCH₃ | N-ethyl-N-(2-sulfoethyl)-m-toluidine | yellowish red |
| 142 | " | " | 6-amino-1-hydroxy-3-sulfonaphthalene | red |
| 143 | " | —CONH₂ | N-ethyl-N-(2-sulfoethyl)-m-toluidine | yellowish red |

-continued
| | | | |
|---|---|---|---|
| 144 | " | 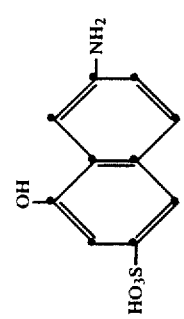 | red |
| 145 | —CONHCH$_3$ | 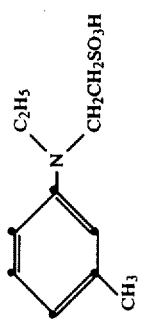 | yellowish red |
| 146 | " | 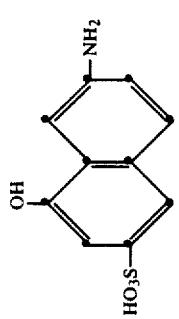 | red |
| 147 | —CON(CH$_3$)$_2$ | 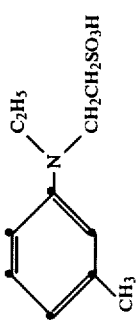 | yellowish red |
| 148 | " | 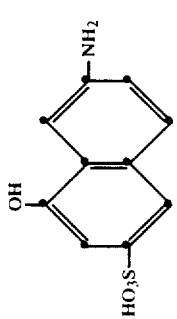 | red |

-continued
| | | | | |
|---|---|---|---|---|
| 149 |  | Cl | 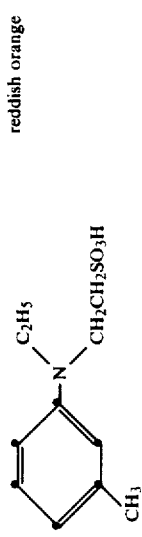 | reddish orange |
| 150 |  | " | 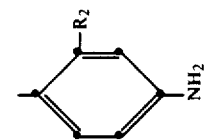 | red |
| 151 |  | —CF$_3$ | 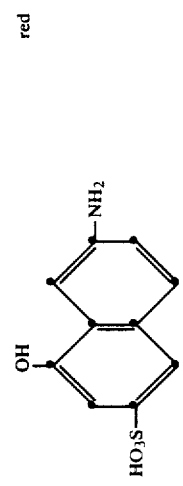 | yellowish red |
| 152 |  | " | 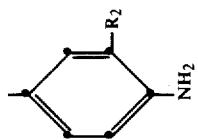 | red |
| 153 |  | —SO$_2$NH$_2$ |  | red |
| 154 |  | —SO$_2$NHCH$_3$ | 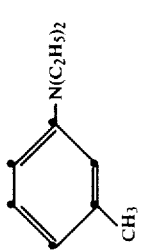 | " |
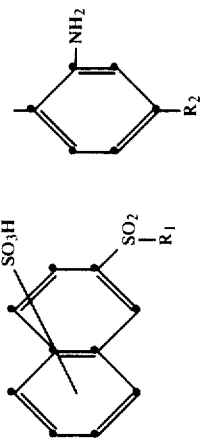

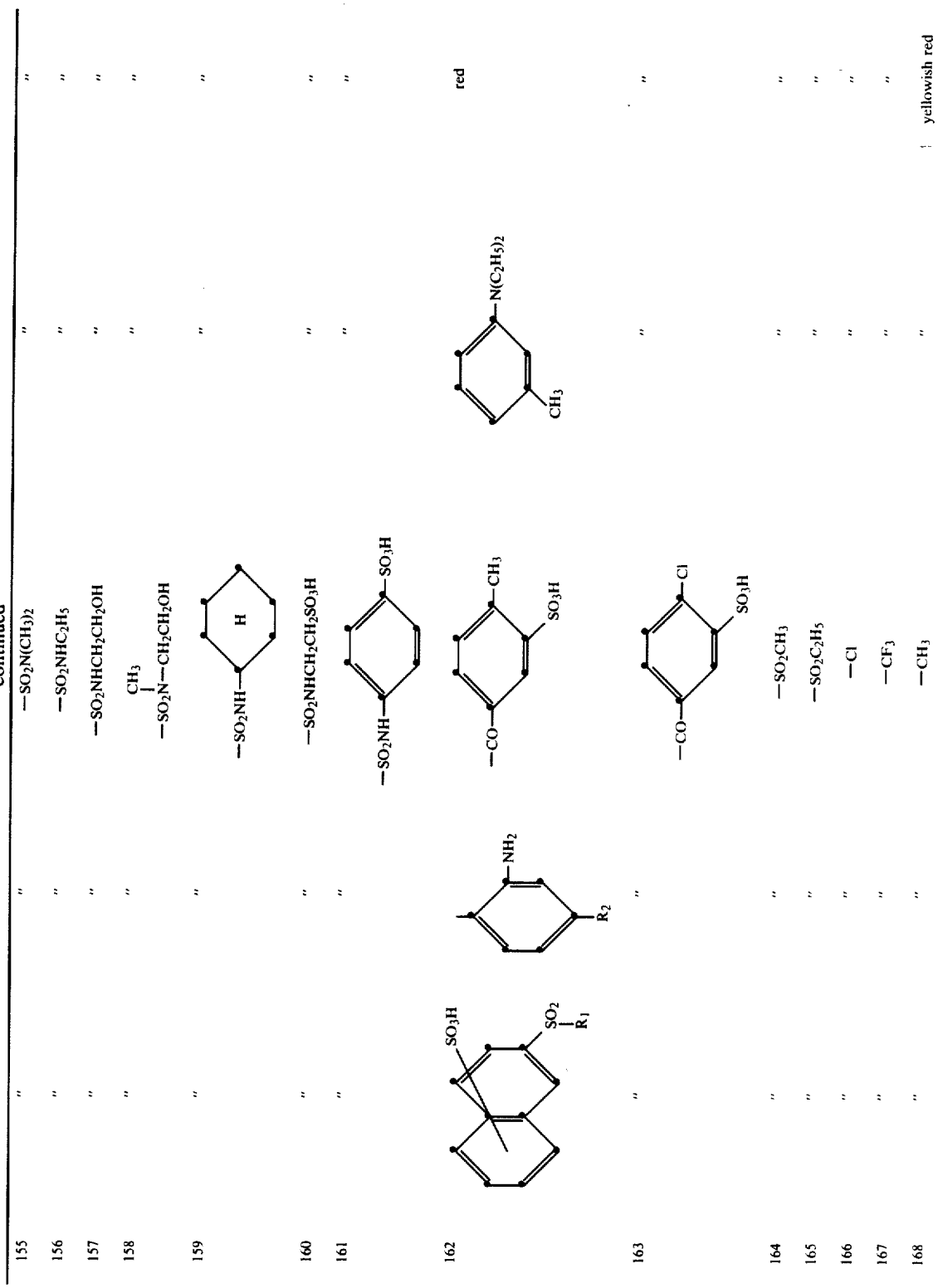

-continued

| No. | | | | | Color |
|---|---|---|---|---|---|
| 169 | [naphthalene with SO₃H, SO₂—R₁] | [phenyl with NH₂, R₂] | —NHCOCH₃ | [phenyl with N(C₂H₅)₂, CH₃] | " |
| 170 | " | " | —SO₃H | " | " |
| 171 | " | " | —COOH | " | yellowish red |
| 172 | " | " | —CONH₂ | " | " |
| 173 | " | " | —CONHCH₃ | " | " |
| 174 | " | " | —CON(CH₃)₂ | " | " |
| 175 | " | " | —H | " | " |
| 176 | " | [phenyl with R₂, NH₂] | " | " | |
| 177 | " | [phenyl with R₂, NH₂] | —OCH₃ | " | red |

-continued

| No. | Diazo component | Coupling component | | Color |
|---|---|---|---|---|
| 178 | naphthalene-SO₃H, SO₂—R₁ | benzene with R₂, NH₂ | —CF₃ | (3-methyl-4-diethylamino)phenyl | red |
| 179 | " | " | —Cl | " | yellowish red |
| 180 | naphthalene-SO₃H, SO₂—R₁ | benzene with NH₂, R₂ | —SO₂NH₂ | " | red |
| 181 | " | " | —SO₂NHCH₃ | " | " |
| 182 | " | " | —SO₂N(CH₃)₂ | " | " |
| 183 | " | " | —SO₂NHC₂H₅ | " | " |
| 184 | " | " | —SO₂NHCH₂CH₂OH | " | " |
| 185 | naphthalene-SO₃H, SO₂—R₁ | benzene with NH₂, R₂ | —SO₂N(CH₃)—CH₂CH₂OH | (3-methyl-4-diethylamino)phenyl | red |

-continued

| No. | (col A) | (col B) | (col C) | color |
|---|---|---|---|---|
| 186 | " | " | ![benzene with H, —SO$_2$NH] | " |
| 187 | " | " | —SO$_2$NHCH$_2$CH$_2$SO$_3$H | " |
| 188 | " | " | ![benzene with SO$_3$H, —SO$_2$NH] | " |
| 189 | " | " | ![benzene with CH$_3$, SO$_3$H, —CO] | " |
| 190 | " | " | ![benzene with Cl, SO$_3$H, —CO] | " |
| 191 | " | " | —SO$_2$CH$_3$ | " |
| 192 | " | " | —SO$_2$C$_2$H$_5$ | " |
| 193 | " | " | ![benzene with N(C$_2$H$_5$)$_2$, CH$_3$] | red |
| 194 | " | ![aniline with NH$_2$, R$_2$] | —CF$_3$ | " |
| 195 | " | ![naphthalene with SO$_3$H, SO$_2$R$_1$] | —CH$_3$ | yellowish red |
| 196 | " | " | —NHCOCH$_3$ | " |
| 197 | " | " | —SO$_3$H | " |

-continued

| No. | | | R₂ | | Color |
|---|---|---|---|---|---|
| 198 | naphthalene-SO₃H, SO₂R₁ | phenyl-NH₂, R₂ | —COOH | toluene-N(C₂H₅)₂, CH₃ | yellowish red |
| 199 | " | " | —CONH₂ | " | " |
| 200 | " | " | —CONHCH₃ | " | " |
| 201 | " | " | —CON(CH₃)₂ | " | " |
| 202 | " | " | —H | " | " |
| 203 | " | R₂/NH₂ phenyl | " | " | " |
| 204 | " | R₂/NH₂ phenyl | —OCH₃ | " | red |
| 205 | " | R₂/NH₂ phenyl | —CF₃ | " | " |
| 206 | " | R₂/NH₂ phenyl | —Cl | " | yellowish red |

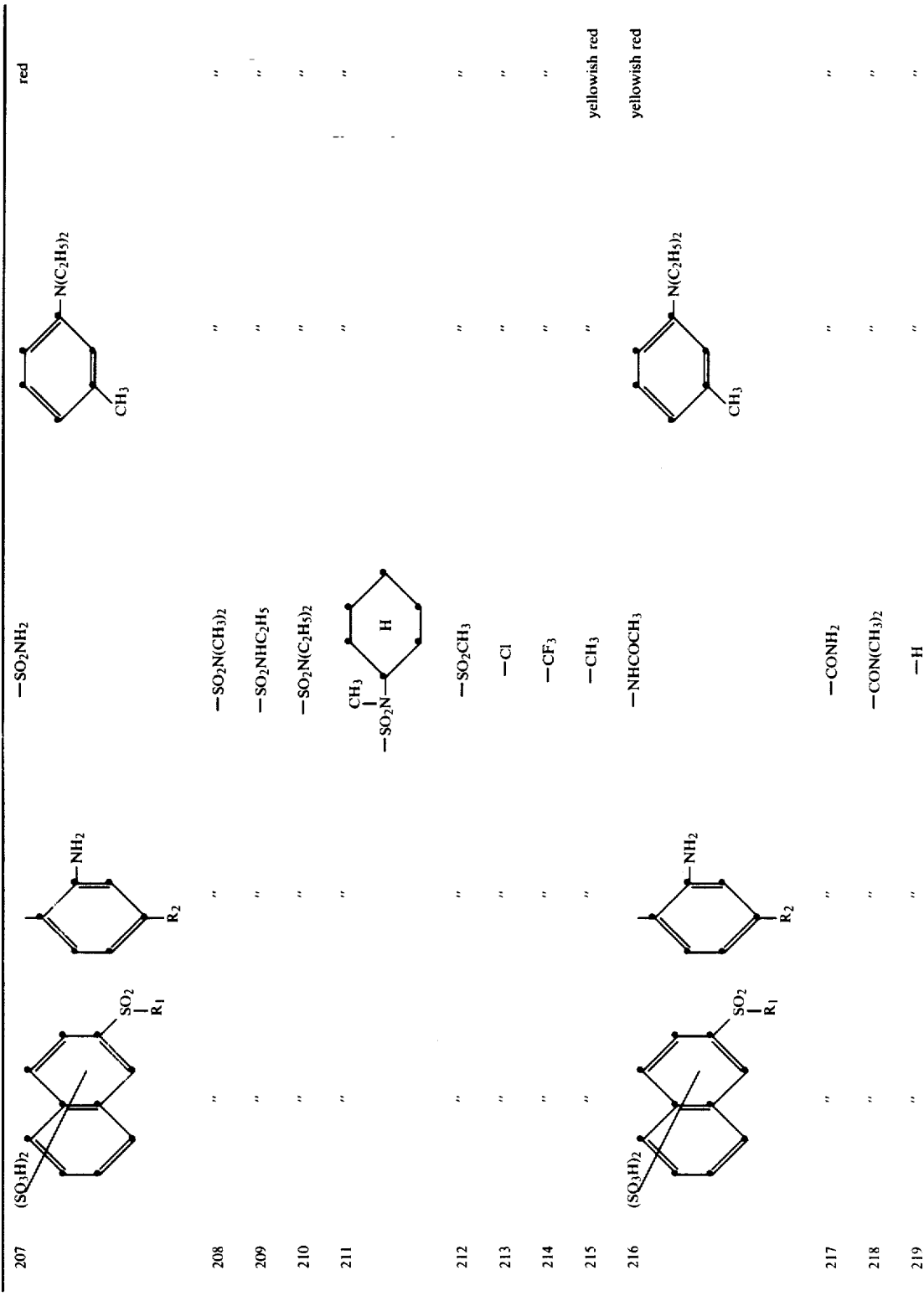

-continued
| | | | | |
|---|---|---|---|---|
| 220 | 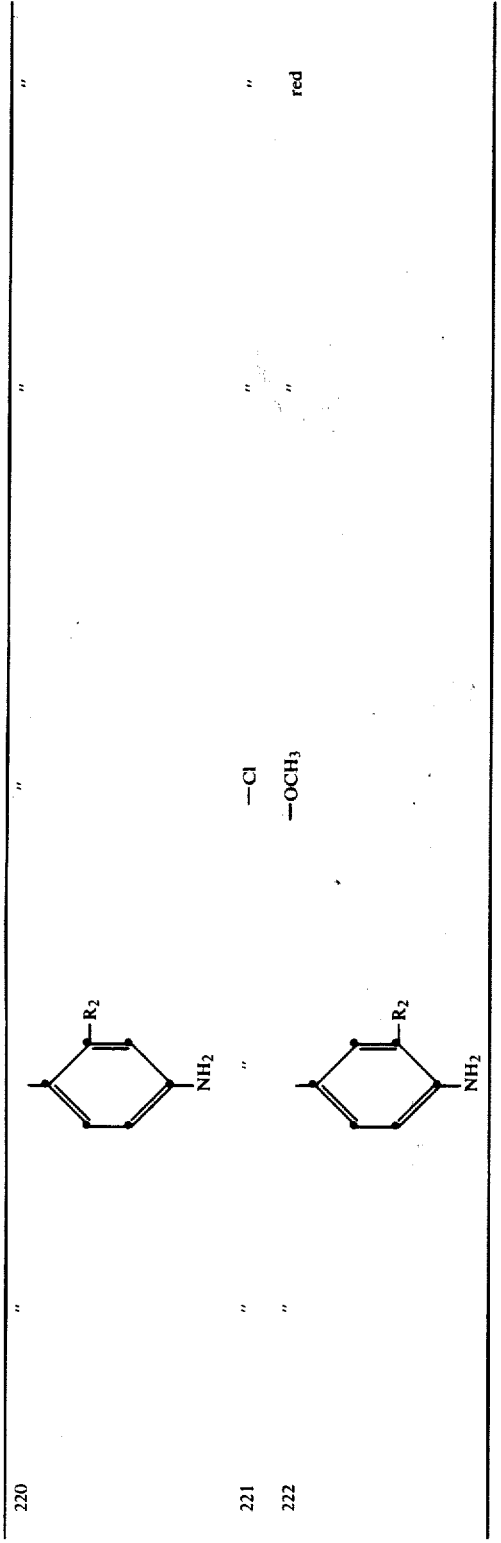 | " | " | " |
| 221 | " | —Cl | " | " |
| 222 | " | —OCH₃ | " | red |

| Example | Diazo component | | R₂ | Coupling component | Shade on polyamide |
|---|---|---|---|---|---|
| | R₁ | | | | |
| 223 | (SO₃H)₂─[naphthalene]─SO₂─R₁ | [benzene with R₂ and NH₂] | —CF₃ | [benzene with N(C₂H₅)₂ and CH₃] | red |
| 224 | " | [benzene with NH₂ and R₂] | —Cl | " | yellowish red |
| 225 | (SO₃H)₂─[naphthalene]─SO₂─R₁ | [benzene with NH₂ and R₂] | —SO₂NH₂ | " | red |
| 226 | " | " | —SO₂N(CH₃)₂ | " | " |
| 227 | " | " | —SO₂NHC₂H₅ | " | " |
| 228 | " | " | —SO₂N(C₂H₅)₂ | " | " |
| 229 | " | " | —SO₂N(CH₃)─[benzene]─H | " | " |
| 230 | " | " | —SO₂CH₃ | " | " |

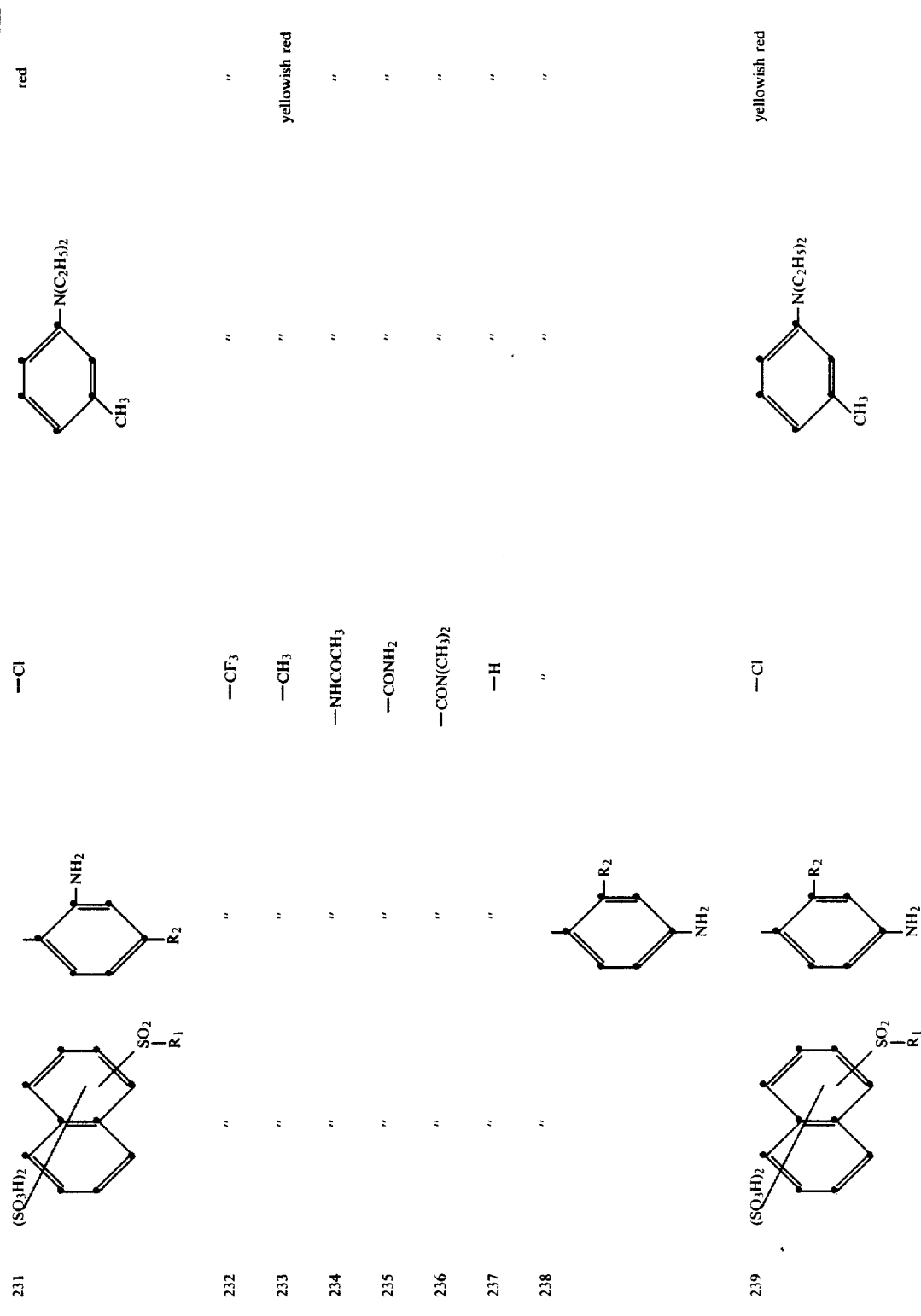

-continued

| | | | | | |
|---|---|---|---|---|---|
| 240 | ![naphthalene with SO2R1 and NHCOCH3] | ![benzene with R2 and NH2] | —OCH₃ | | red |
| 241 | " | " | —CF₃ | " | " |
| 242 | " | ![benzene with NH2 and R2] | —Cl | " | yellowish red |
| 243 | " | ![benzene with NH2 and R2] | —SO₃H | " | red |
| 244 | " | " | ![benzene with SO2NH and SO3H] | " | " |
| 245 | " | ![benzene with NH2 and R2] | —SO₂NHCH₂CH₂SO₃H | " | " |
| 246 | ![naphthalene with SO2R1 and NHCOCH3] | " | ![benzene with SO2NH, Cl, SO3H] | ![benzene with N(C2H5)2 and CH3] | red |

-continued
| | | | |
|---|---|---|---|
| 247 | 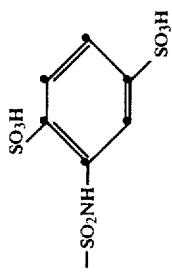 | " | " |
| 248 | 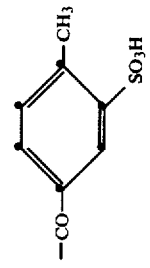 | " | " |
| 249 | 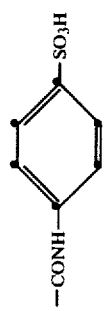 | " | " |
| 250 | —SO₃H | " | yellowish red |
| 251 | " | 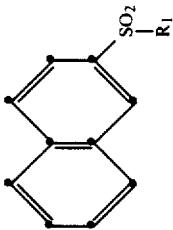 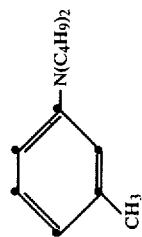 | " |
| 252 | " | 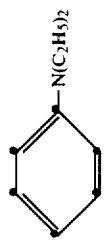 | " |
| | " | 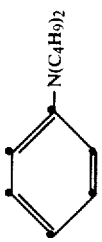 | " |

| | -continued | | |
|---|---|---|---|
| | 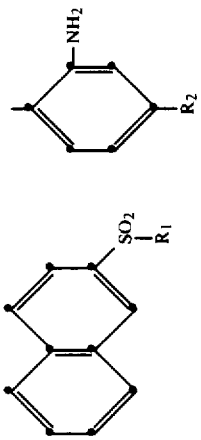 | | |
| 253 | —SO₃H | 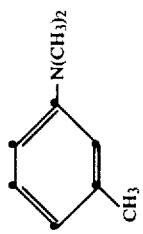 | yellowish red |
| 254 | " | 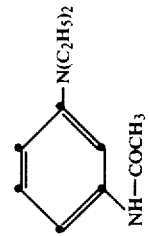 | " |
| 255 | " | 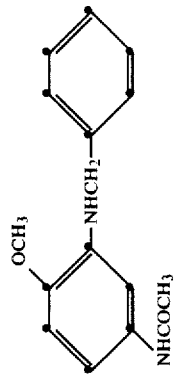 | red |
| 256 | " | 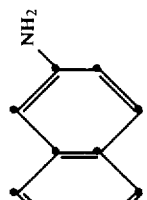 | " |
| 257 | " | 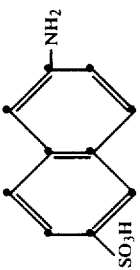 | " |
| 258 | " | 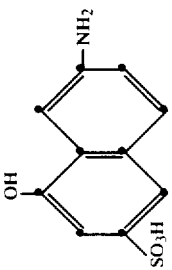 | " |

-continued
| | 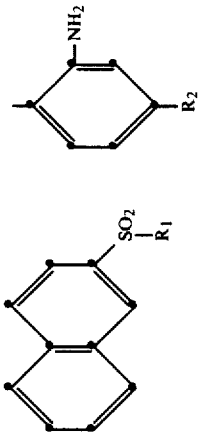 | | | |
|---|---|---|---|---|
| 259 | | —SO₃H | 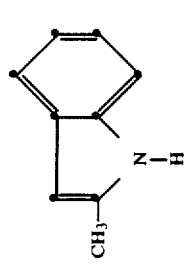 | reddish yellow |
| 260 | " | " | 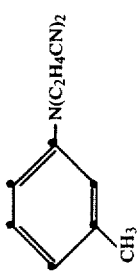 | orange |
| 261 | " | " | 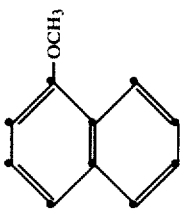 | " |
| 262 | " | " | 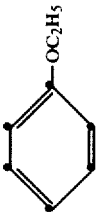 | yellowish orange |
| 263 | " | " | 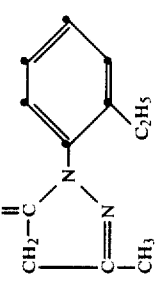 | reddish yellow |

| | | | |
|---|---|---|---|
| 264 | naphthalene-SO₂-R₁ | aniline with R₂ (para), NH₂ | -SO₃H | pyrazolone with NH, CH₂, C=N, CH₃, phenyl | yellow |
| 265 | " | " | " | chloro-phenyl-NH-N=C(-(CH₂)₄CH₃)-naphthalene with OH and SO₃H | red |
| 266 | naphthalene-SO₂-R₁ | " | " | p-tolyl-N(C₄H₉)₂ | yellowish red |
| 267 | " | " | " | phenyl-N(C₂H₅)₂ | " |
| 268 | " | " | " | phenyl-N(C₄H₉)₂ | " |

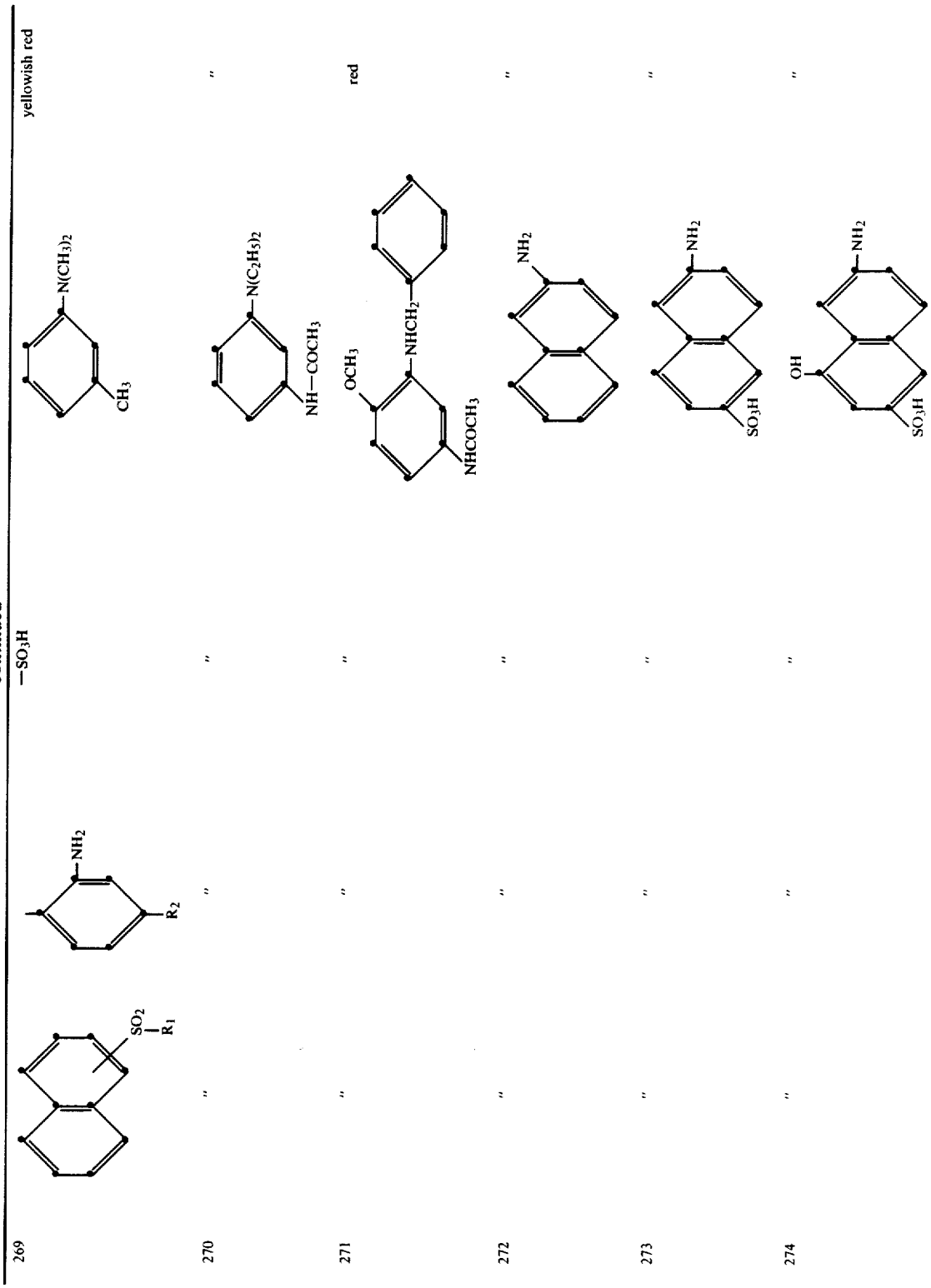

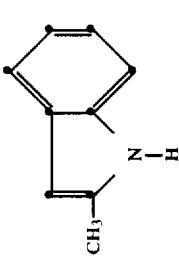

-continued

| # | | | | color |
|---|---|---|---|---|
| 280 | naphthalene-SO₂-R₁ | aniline with NH₂, R₂ | —SO₃H | yellow |
| 281 | " | " | " | red |
| 282 | naphthalene-SO₂-R₁ | " | benzene-SO₃H, -SO₂NH- | " |
| 283 | " | " | -SO₂NHCH₂CH₂SO₃H | " |
| 284 | " | " | benzene-SO₃H, -CONH- | yellowish red |

-continued

| | $\begin{array}{c}\text{SO}_2\text{—R}_1\\ \text{[naphthalene]}\end{array}$ | $\begin{array}{c}\text{NH}_2\\ \text{[benzene]}\text{—R}_2\end{array}$ | | | |
|---|---|---|---|---|---|
| 285 | " | " | —CONH—[C6H4]—SO3H | CH3–C(=NH)–N=C(CH3)– (ring) —[C6H4] | yellow |
| 286 | " | " | —SO2NH—[C6H4]—SO3H | " | " |
| 287 | " | " | | [indole with CH3, N—H] | reddish yellow |
| 288 | " | " | —CONH—[C6H4]—SO3H | " | " |
| 289 | " | " | —SO2NH2 | CH2–C(=NH)–N=C(CH3)– (ring) —[C6H4]—SO3H | yellow |
| 290 | " | " | —SO2NHCH3 | " | " |
| 291 | " | " | —SO2N(CH3)—[C6H4]—H | " | " |

| Example | Diazo component | | Coupling component | Shade on polyamide |
|---|---|---|---|---|
| | $R_1$ | $R_2$ | | |
| 292 | naphthyl-SO$_2$-R$_1$ with NH$_2$, R$_2$ on phenyl | —CONH$_2$ | phenyl with NH–C(=N–N=C–CH$_3$)–CH$_2$ pyrazolone, SO$_3$H | yellow |
| 293 | " | —CON(CH$_3$)$_2$ | " | " |
| 294 | " | —SO$_2$C$_2$H$_5$ | " | " |
| 295 | " | —NHCOCH$_3$ | " | " |
| 296 | " | —CF$_3$ | " | " |
| 297 | " | —Cl | " | " |
| 298 | " | —SO$_2$NH$_2$ | " | " |
| 299 | " | —CON(CH$_3$)$_2$ | chloro-phenyl pyrazolone-SO$_3$H | " |
| 300 | " | —SO$_2$CH$_3$ | " | yellow |
| 301 | " | —NHCOCH$_3$ | " | " |
| 302 | " | —Cl | " | " |
| 303 | " | —CF$_3$ | " | " |

-continued

| No. | | | | | Color |
|---|---|---|---|---|---|
| 304 | naphthalene with SO₂R₁ | phenyl with NH₂ and R₂ | —SO₂NH₂ | naphthalene with NH₂ and HO₃S | red |
| 305 | " | " | " | " | " |
| 306 | " | " | —Cl | phenyl with N(C₄H₉)₂ and CH₃ | red |
| 307 | " | " | —SO₂NHCH₂CH₂SO₃H | " | " |
| 308 | naphthalene with SO₂R₁ | phenyl with NH₂ and R₂ | phenyl with —CONH— and SO₃H | " | yellowish red |
| 309 | " | " | phenyl with —CONH— and SO₃H | pyrazolone with NH, CH₃, N=, N—phenyl, CH₃ | yellow |
| 310 | " | " | phenyl with —SO₂NH— and SO₃H | " | " |

-continued
| | | | | |
|---|---|---|---|---|
| 311 | 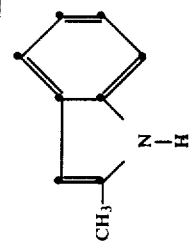 | —CONH— 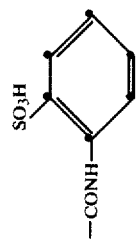 —SO₂NH₂ | | reddish yellow |
| 312 | " | " | | " |
| 313 | 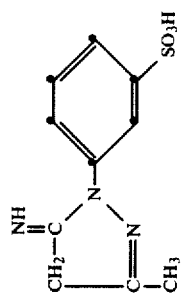 | —SO₂NHCH₃ 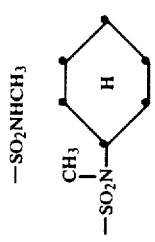 —CONH₂ | | yellow |
| 314 | " | " | | " |
| 315 | " | " | | " |
| 316 | 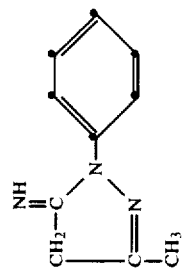 | 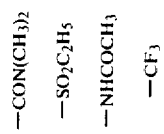<br> |  | yellow |
| 317 | " | —CON(CH₃)₂ | | " |
| 318 | " | —SO₂C₂H₅ | | " |
| 319 | " | —NHCOCH₃ | | " |
| 320 | " | —CF₃ | | " |

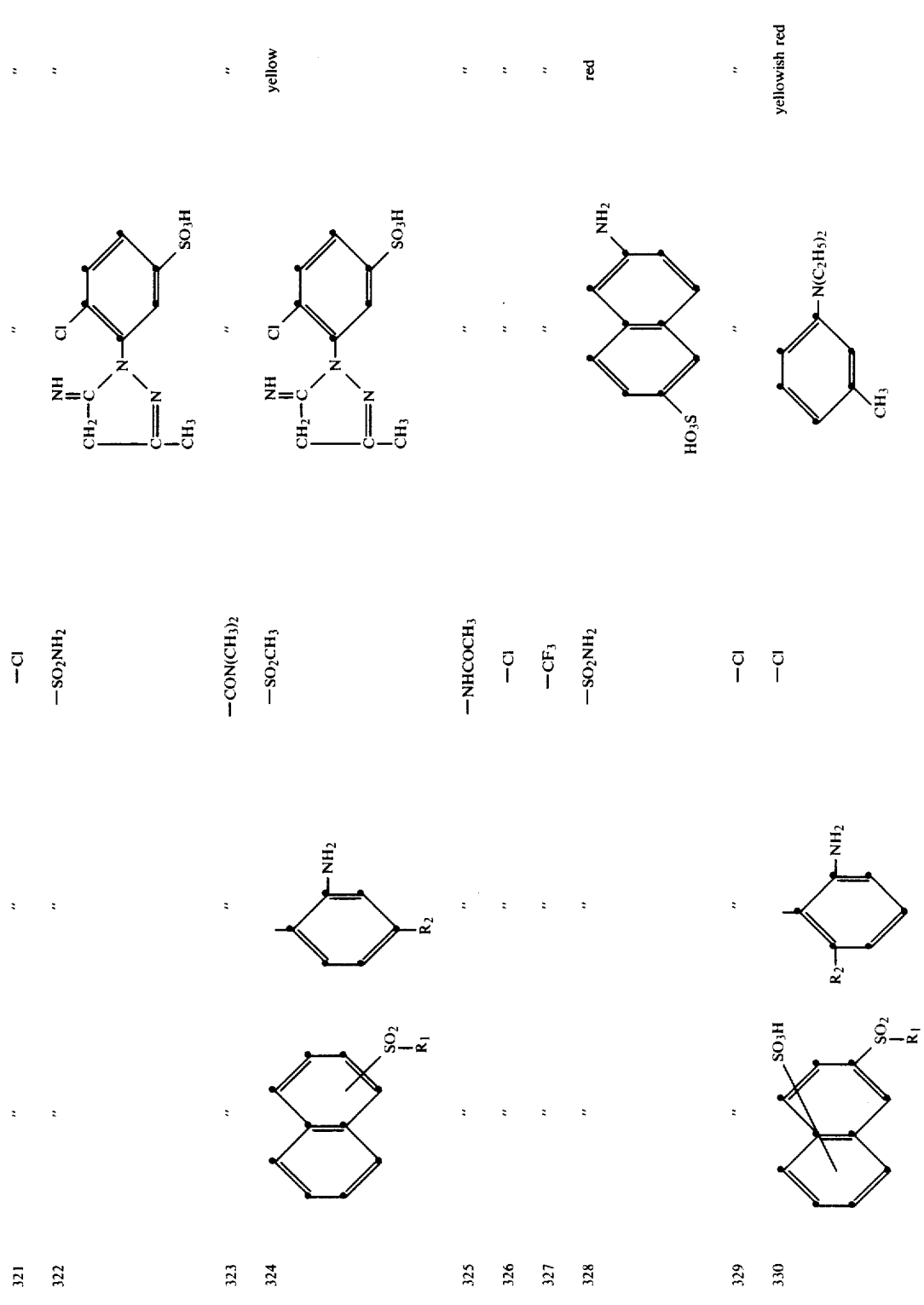

-continued
| | | | | |
|---|---|---|---|---|
| 331 | " | " | 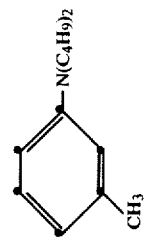 | " | reddish yellow |
| 332 | " | " | 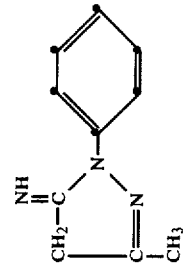 | | yellow |
| 333 | " | " | 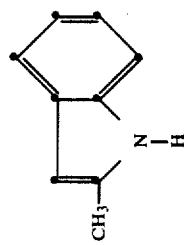 | | reddish yellow |
| 334 | " | " | —H | 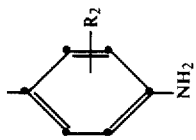 | " |
| 335 | " | " | 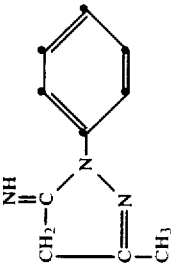 | | yellow |

| No. | | | | Color |
|---|---|---|---|---|
| 336 | naphthalene with SO₃H, SO₂R₁ | phenyl with R₂, NH₂ | —H | greenish yellow |
| | | | CH₃ group, CONH₂, C=O, N—C₂H₅, HO structure | |
| 337 | " | " | " | yellow |
| | | | pyrimidine with NH₂, N, N, NH₂ | |
| 338 | " | phenyl with NH₂, R₂ | Cl | reddish yellow |
| | | | indole-type with CH₃, N—H | |
| 339 | " | " | —SO₂NH₂ | " |
| 340 | " | " | —CF₃ | " |
| 341 | " | " | —CONH₂ | " |
| 342 | " | " | —H | " |
| 343 | " | phenyl with NH₂, R₂ | —H | yellow |
| | | | phenyl-N ring with NH=C, N, CH₂, CH₃ | |
| 344 | naphthalene with SO₃H, SO₂R₁ | " | —SO₂NH₂ | " |
| 345 | " | " | —CF₃ | " |

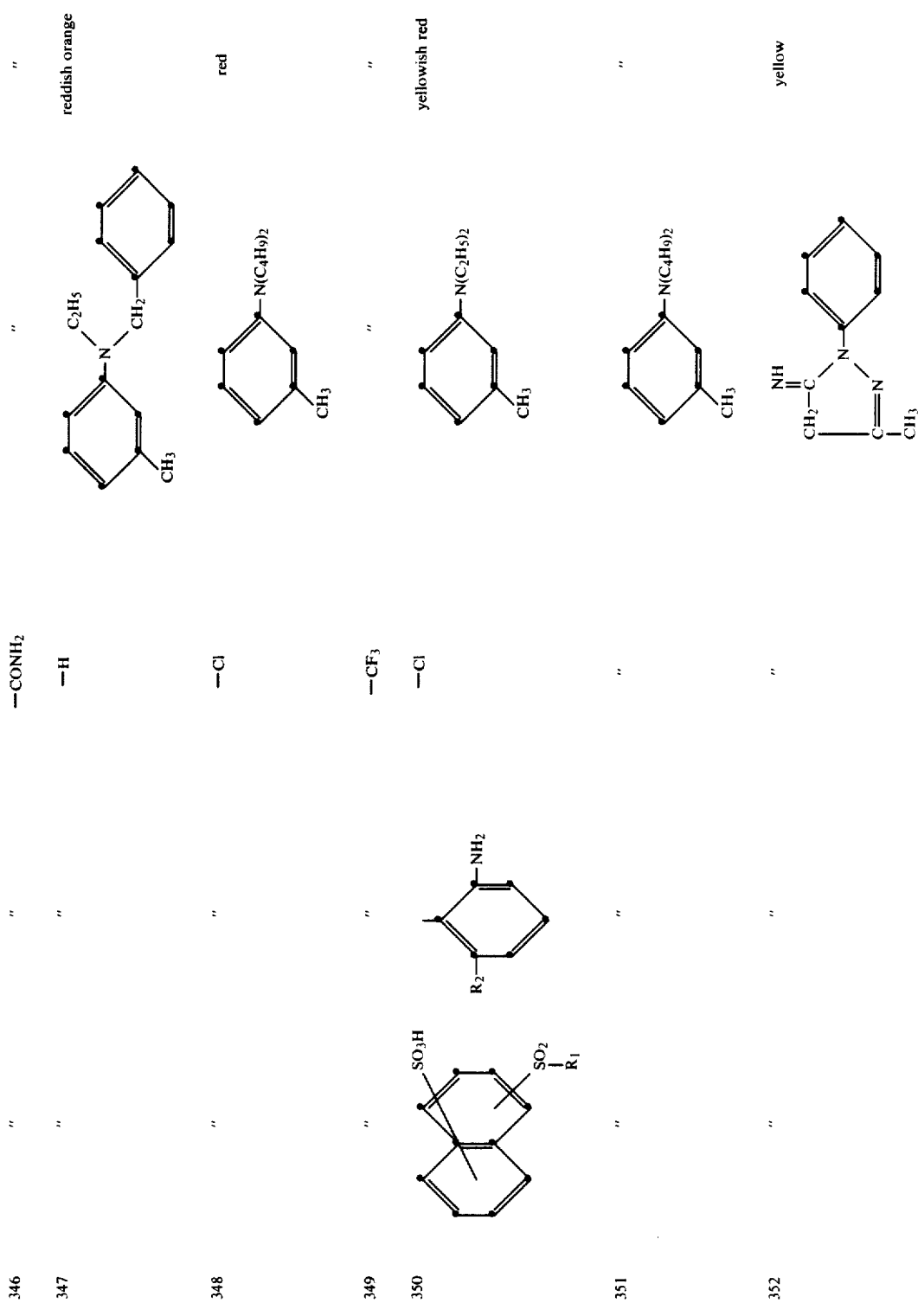

-continued
| | | | |
|---|---|---|---|
| 353 | " | 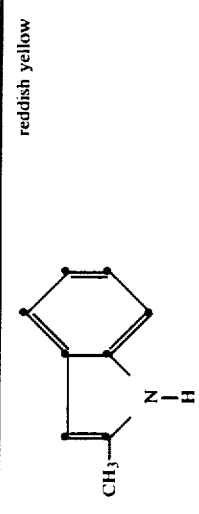 | reddish yellow |
| 354 | —H | " | " |
| 355 | " | 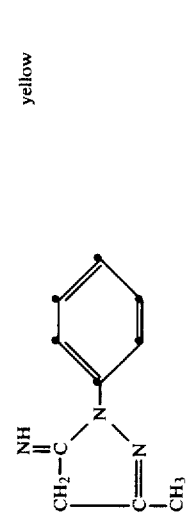 | yellow |
| 356 | —H | 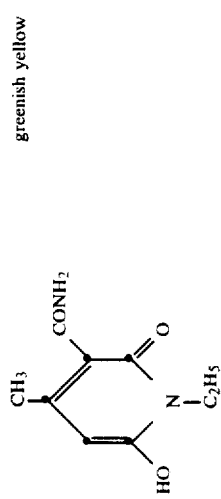 | greenish yellow |
| 357 | " | 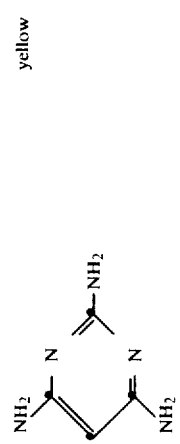 | yellow |
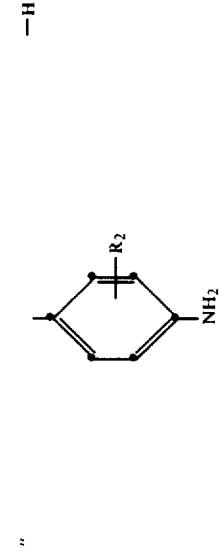
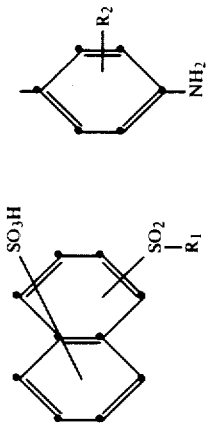

| | | | |
|---|---|---|---|
| 358 | ″ (NH₂-phenyl-R₂) | Cl | ″ reddish yellow (indole-CH₃) |
| 359 | ″ | —SO₂NH₂ | ″ |
| 360 | ″ | —CF₃ | ″ |
| 361 | ″ | —CONH₂ | ″ |
| 362 | ″ | H | ″ |

| Example | Diazo component R₁ | R₂ | Coupling component | Shade on polyamide |
|---|---|---|---|---|
| 363 | naphthalene-SO₃H, SO₂-R₁ with phenyl-NH₂ (R₂) | —H | pyrazolone with N-phenyl (CH₂—C=NH, C=N—CH₃) | yellow |
| 364 | " | —SO₂NH₂ | " | " |
| 365 | " | —CF₃ | " | " |
| 366 | " | —CONH₂ | " | " |
| 367 | " | —H | N(C₂H₅)(CH₂-phenyl)-(3-methylphenyl) | reddish orange |
| 368 | " | —Cl | 3-methyl-N(C₄H₉)₂-aniline | red |
| 369 | naphthalene-SO₃H, SO₂-R₁ with phenyl-NH₂ (R₂) | —CF₃ | " | " |
| 370 | " | —SO₂NH₂ | 3-methyl-N(C₄H₉)₂-aniline | red |

| | -continued | | |
|---|---|---|---|
| 371 | " | 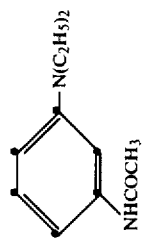 | " |
| 372 | " | 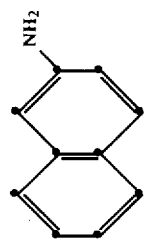 | " |
| 373 | " | 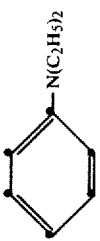 | yellowish red |
| 374 | " | 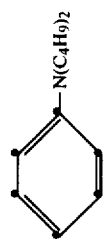 | " |
| 375 | " | 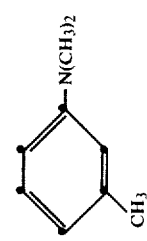 | " |
| 376 | $-SO_2NH_2$ | 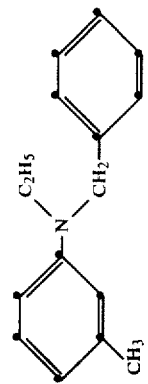 | yellowish red |
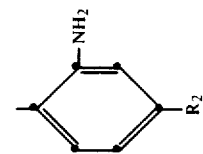

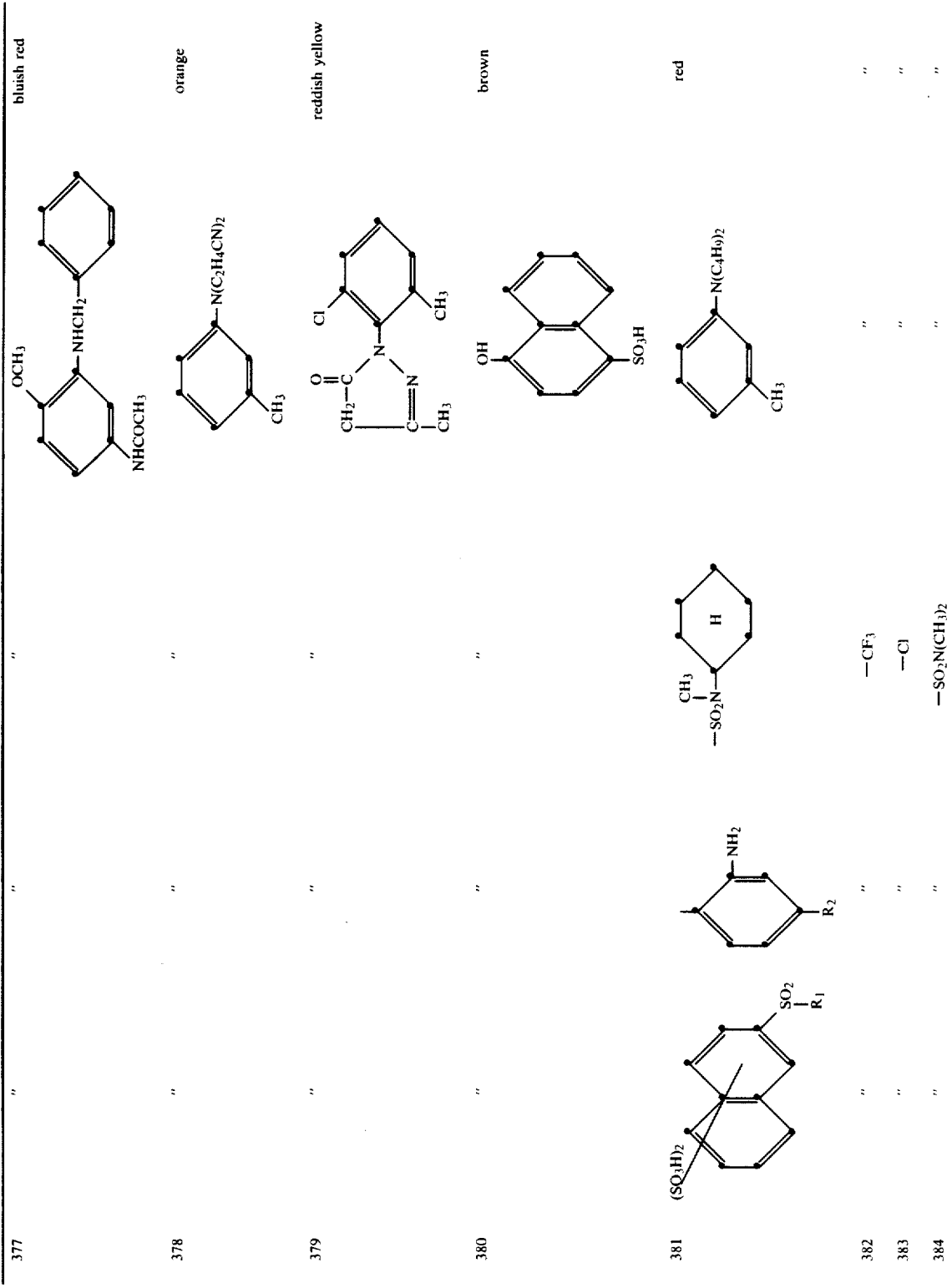

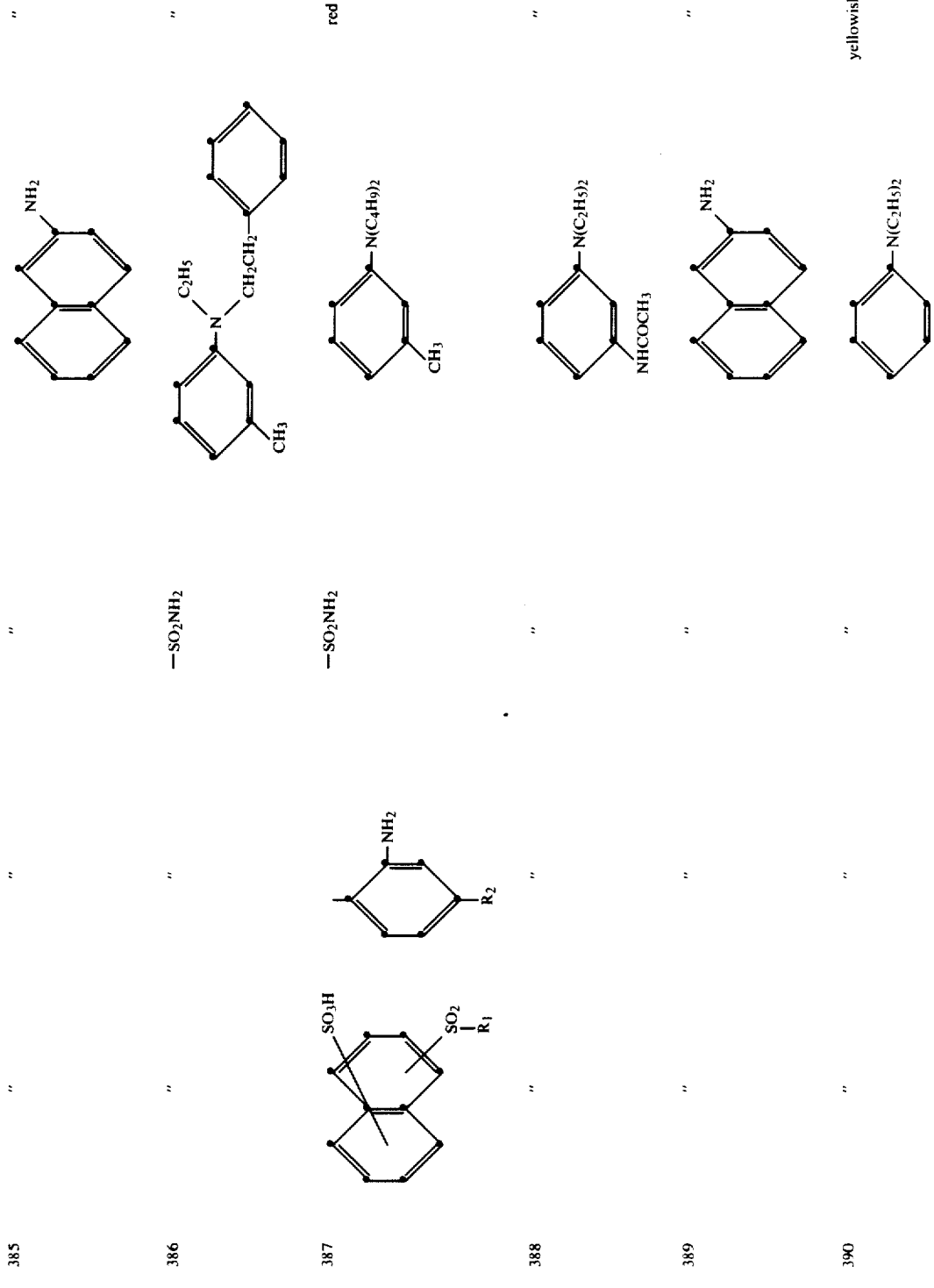

-continued
| | | | |
|---|---|---|---|
| 391 | 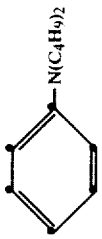 | " | " |
| 392 | 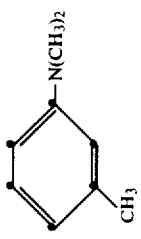 | " | " |
| 393 | 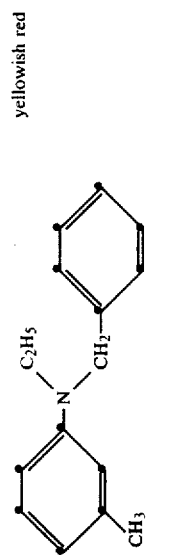 | —SO$_2$NH$_2$ | yellowish red |
| 394 | 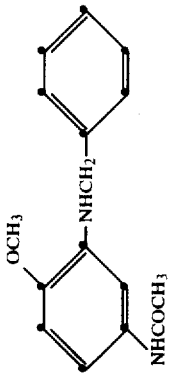 | " | bluish red |
| 395 | 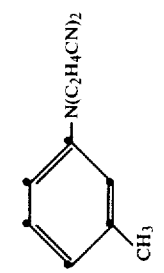 | " | orange |
| 396 | 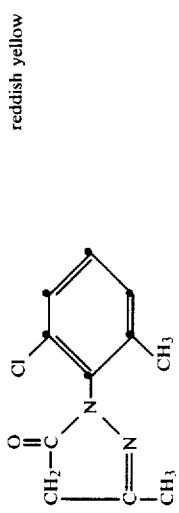 | " | reddish yellow |
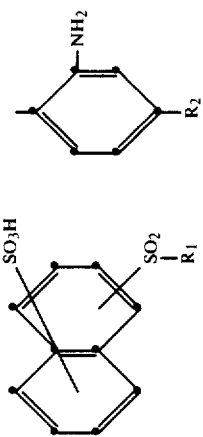

| | | | | |
|---|---|---|---|---|
| 397 | [naphthalene with (SO₃H)₂ and SO₂R₁] | [benzene with R₂ and NH₂] | [naphthalene with OH and SO₃H] | brown |
| 398 | " | " | [benzene with CH₃, SO₂N, H] | [benzene with N(C₄H₉)₂ and CH₃] | red |
| 399 | " | " | —CF₃ | " | " |
| 400 | " | " | —Cl | " | " |
| 401 | " | " | —SO₂N(CH₃)₂ | " | " |
| 402 | " | " | " | [naphthalene with NH₂] | " |
| 403 | " | " | —SO₂NH₂ | [N(C₂H₅)(CH₂CH₂-phenyl)(tolyl)] | " |

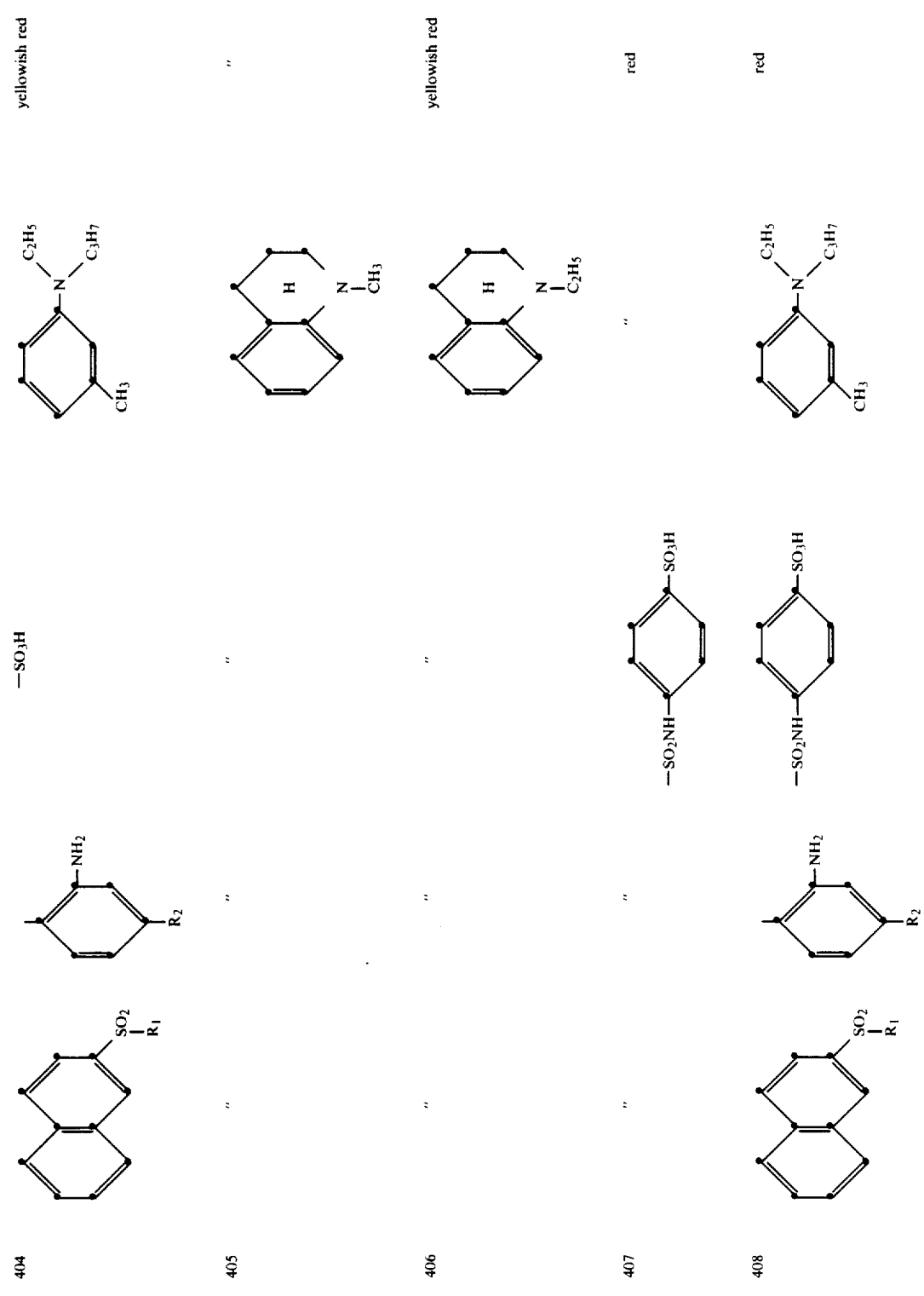

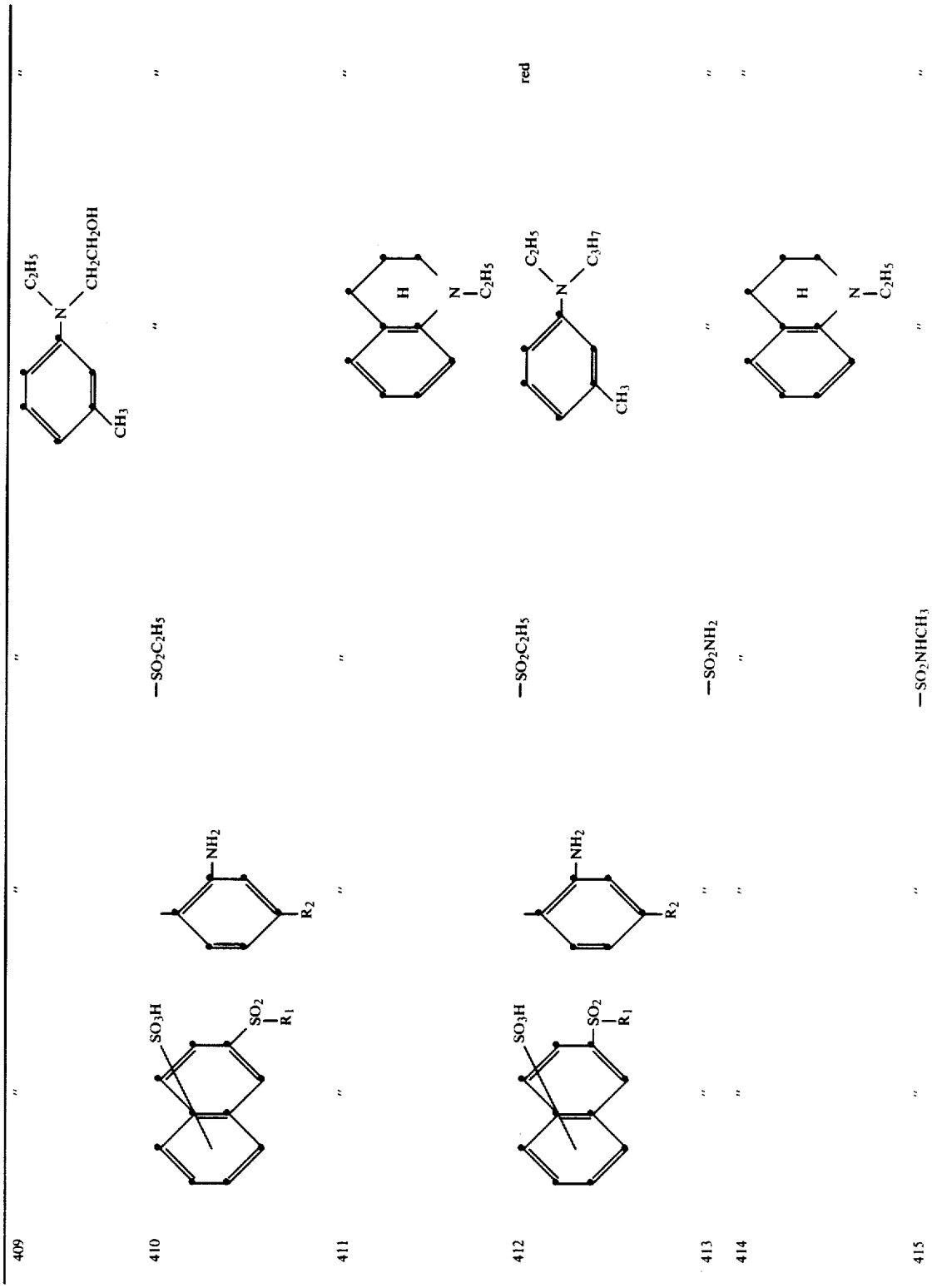

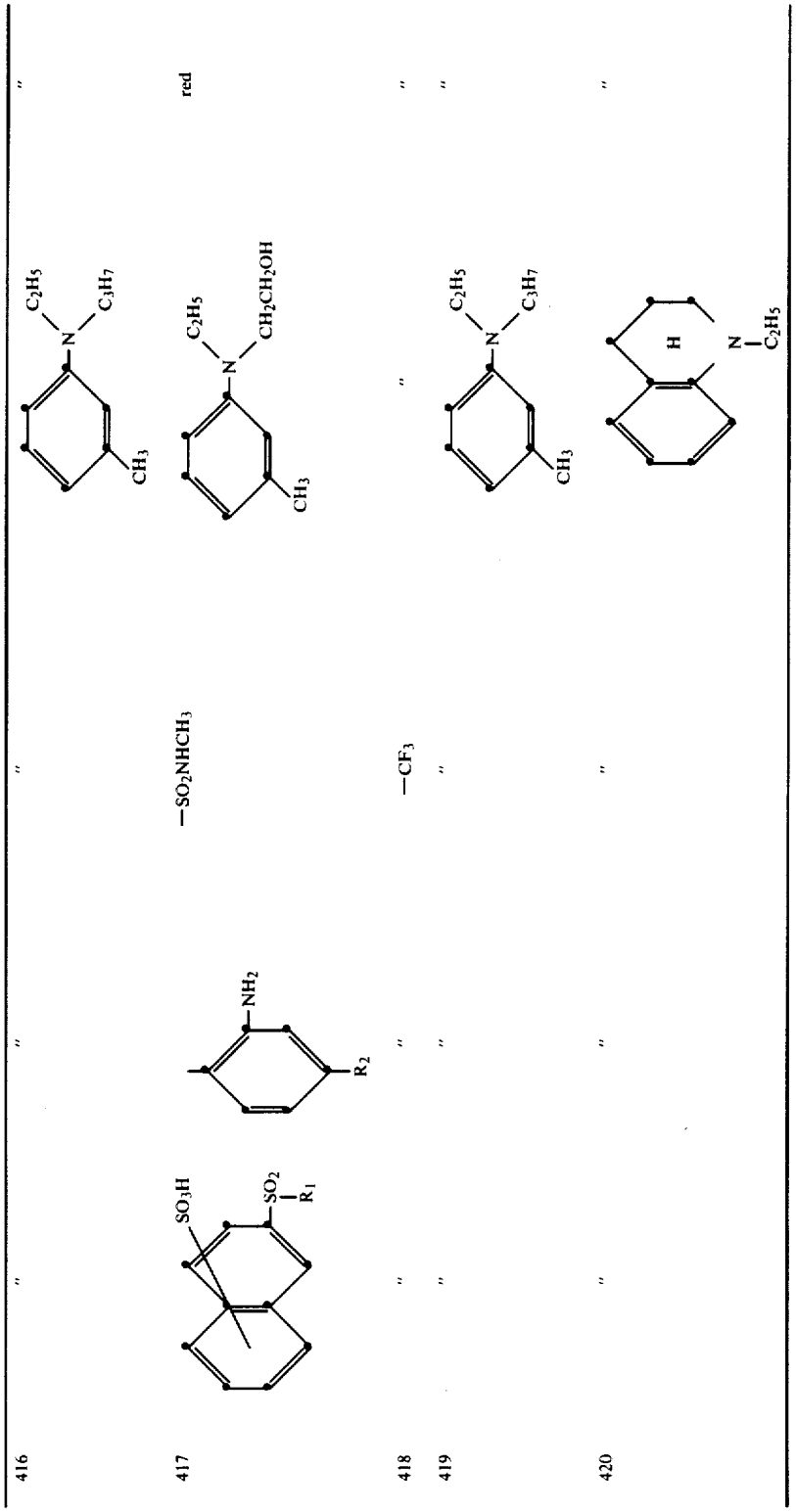

TABLE 2
| Example | Diazo component | | Coupling component | Shade on wool |
|---|---|---|---|---|
| | $R_1$ | $R_2$ | | |
| 421 | 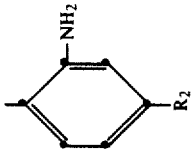 | —SO₃H |  | red |
| 422 | " | " | 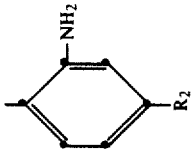 | " |
| 423 | " | " | 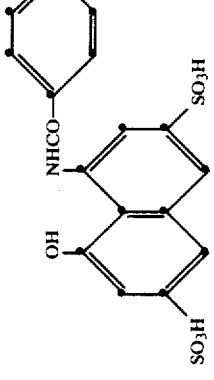 | yellowish red |
| 424 | " | " | 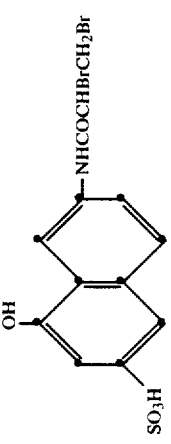 | reddish orange |

TABLE 2-continued

| Example | Diazo component | | Coupling component | Shade on wool |
|---|---|---|---|---|
| | R$_1$ | R$_2$ | | |
| 425 | naphthalene-SO$_2$-R$_1$ with aniline-NH$_2$/R$_2$ | —SO$_3$H | naphthalene(OH)(SO$_3$H)(NHCO-)-phenyl(NH-)-pyrimidine with F, Cl, F substituents | red |
| 426 | naphthalene with SO$_3$H and SO$_2$-R$_1$ | —Cl | naphthalene(OH)(SO$_3$H)(NHCO-)-phenyl-NHCOCHBrCH$_2$Br | " |
| 427 | " | " | naphthalene(OH)(SO$_3$H)-phenyl-NHCOCHBrCH$_2$Br | yellowish red |
| 428 | " | —CF$_3$ | " | " |
| 429 | " | " | naphthalene(OH)(SO$_3$H)(NHCO-)-phenyl-NHCOCHBrCH$_2$Br | red |

TABLE 2-continued

| Example | Diazo component R₁ | R₂ | Coupling component | Shade on wool |
|---|---|---|---|---|
| 430 | ″ | —SO₂NH₂ | | ″ |
| 431 | ![aniline with R₂] | —SO₃H | ![naphthol coupling with NHCO-phenyl-NHCOCHBrCH₂Br and SO₃H groups] | red |
| 432 | ″ | ″ | ![naphthol coupling with NHCO-phenyl-NHCOCHBrCH₂Br and SO₃H groups] | ″ |
| 433 | ″ | ″ | ![naphthol with NHCOCHBrCH₂Br and SO₃H] | yellowish red |
| 434 | ″ | ″ | ![naphthol with N(CH₃)—COCHBrCH₂Br and SO₃H] | reddish orange |

(Diazo component structure for 431–434: naphthalene with SO₂—R₁ substituent)

TABLE 2-continued

| Example | Diazo component R₁ | R₂ | Coupling component | Shade on wool |
|---|---|---|---|---|
| 435 | naphthalene-SO₂-R₁ with NH₂-phenyl-R₂ | —SO₃H | naphthalene with OH, NHCO-[phenyl-NH-(difluoropyrimidinyl with Cl)], SO₃H, SO₃H | red |
| 436 | naphthalene with SO₃H and SO₂-R₁ | —Cl | naphthalene with OH, NHCO-(phenyl-NHCOCHBrCH₂Br), SO₃H, SO₃H | " |
| 437 | " | " | naphthalene with OH, NHCOCHBrCH₂Br, SO₃H | yellowish red |
| 438 | " | —CF₃ | " | " |
| 439 | " | " | naphthalene with OH, NHCO-(phenyl-NHCOCHBrCH₂Br), SO₃H, SO₃H | red |
| 440 | " | —SO₂NH₂ | " | " |

Dyeing Procedure I 10 parts of Helanca ® tricot are dyed in 500 parts of an aqueous liquor which contains 1g/1 of monosodium phosphate and which is adjusted to pH with disodium phosphate. The concentration of dye of Example 13 is 0.7%, based on the weight of the fabric. The fabric is dyed for 30 to 90 minutes at 98° C., then removed from the bath and washed and dried in the usual manner. The tricot fabric is dyed in a pure yellowish red shade of very good general fastness properties.

Dyeing Procedure II 10 parts of wool are dyed for 30 to 90 minutes at a temperature of 98° C. in 500 parts of an aqueous liquor containing, based on the weight of the fabric, 4% by weight of ammonium sulfate, 1.5% by weight of 80% acetic acid, 1% by weight of a substituted alkylaminopolyglycol ether and 3% by weight of the dye of Example 15. The bath is the cooled to 80° C., neutralised with 2.5% by weight of 25% aqueous ammonia, and the fabric is treated for 15 minutes at this temperature. The wool is then removed from the bath and washed and dried in the usual manner. The wool is dyed in a pure shade of good general fastness properties.

What is claimed is:

1. A monoazo dye of the formula

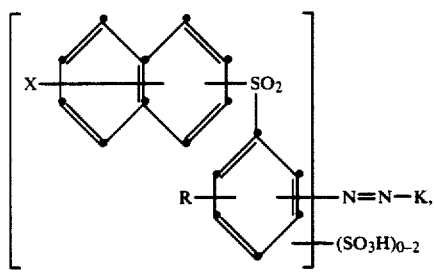

(1)

wherein K is an aminobenzene, alkoxybenzene, alkoxynaphthalene, phenol, naphthol, pyrazolone, pyrimidine, pyridone, indole, diphenylamine, acetoacetamide, naphthimidazole, tetrahydroquinoline or pyrazolo-[2,3-a] -pyrimidine radical or K is an aminonaphthalene radical which is unsubstituted or substituted by sulfo or an aminoaphthol radical which is substituted in the naphthalene nucleus by sulfo,and wherein the amino group is unsubstituted or substituted by methyl, ethyl, dimethyl, diethyl, cyanoethyl, hydroxyethyl, dihydroxyethyl, cyclohexyl, benzyl, pheynyl, acryloyl, mono-,di- or trichloroacryloyl or -metacryloyl, mono-, di-or tribromoacryloyl or -metacryloyl, —CO—CCl═CH—COOH, —CO—CH═CCl—COOH, 2-chloropropionyl, 3-phenylsulfonylpropionyl, 3-methylsulfonylpropionyl, β-sulfatoethylaminousulfonyl, vinylsulfonyl, β-chlorethylsulfonyl, βsulfatoethylsulfonyl, βmethylsulfonylethyl-sulfonyl, β-phenylsulfonylethylsulfonyl, 2-fluoro-2-chloro-3,3-difluorocyclobutane-1-carbonyl, 2,2,3,3-tetrafluorocyclobutanecarbon-1-or -sulfon-1-yl, β(2,2,3,3-tetrafluorocyclobut-1-yl)-acryloyl, α-or β-methylsulfonylacryloyl, chloroacetyl, bromoacetyl, α, β-di-chloropropionyl, αβ-dibromopropionyl, α-chloroacryloyl, α-bromo-acryloyl, 2,4-difluoro-5-chloropyrimid-6-yl, 2,4,6-trifluoroyrimid-5-yl, 2,4-dichloro-5-methylsulfonylpyrimid-6-yl, 2,4-difluoro-5-methylsulfonylpyrimid-6-yl, 2,4-difluorotriazin-6-yl, chloro-or fluorotriazinyl radicals of the formula

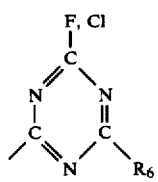

wherein $R_6$ is an unsubstituted or substituted amino group or a free or etherified oxy or thio group, or K is 1-phenyl-3-methyl -5-amino pyrazole, and R is hydrogen, halogen, carboxy, $C_{1-6}$-alkyl unsubstituted or substituted by halogen, hydroxy, sulfato, sulfo, carboxy, cyano, $C_{1-4}$-alkoxy, $C_{1-6}$-alkanoyl, benzoyl, phenyl, naphthyl or cycloalkyl; $C_{1-6}$-alkoxy unsubstituted or substituted by halogen, hydroxy, carboxy or sulfo; $C_{2-6}$-alkanoylamino unsubstituted or substituted by halogen; $C_{1-6}$-alkylsulfonylamino unsubsituted or substituted by halogen or $C_{1-4}$-alkoxy: $C_{1-6}$-alkylsulfonyl; phenyl-($C_{1-4}$)-alkyl-sulfonyl or naphthyl-($C_{1-4}$)-alkylsulfonyl unsubstituted or substituted in the phenyl or naphthyl moiety by $C_{1-4}$-alkyl, $C_{1-4}$-alkoxy, halogen, $C_{1-6}$-alkanoylamino, hydroxy, carboxy or sulfo; or benzoyl unsubstituted or substituted by $C_{1-4}$-alkyl, $C_{1-4}$-alkoxy, halogen, $C_{1-6}$-alkanoylamino, hydroxy, carboxy or sulfo; or is

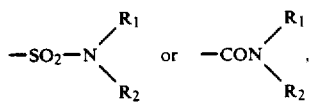

where each of $R_1$ and $R_2$ independently of the other is hydrogen or $C_{1-6}$-alkyl unsubstituted or substituted by halogen, hydroxy, sulfato, sulfo, carboxy, cyano, $C_{1-4}$-alkoxy, $C_{1-6}$-alkanoyl, benzoyl, phenyl, naphthyl or cycloalkyl; $C_{5-7}$-cycloalkyl unsubstituted or substituted by halogen, $C_{1-4}$-alkyl or $C_{1-4}$-alkoxy; phenyl or naphthyl unsubstituted or substituted in the phenyl or naphthyl moiety by $C_{1-4}$ -alkyl, $C_{1-4}$-alkoxy, halogen, $C_{1-6}$-alkanoylamino, hydroxy, carboxy or sulfo; and wherein X is hydrogen, halogen, $C_{1-6}$-alkyl unsubstituted or substituted as given for R as substituted $C_{1-6}$-alkyl; $C_{1-6}$-alkoxy unsubstituted or substituted as given for R as substituted $C_{1-6}$-alkoxy; $C_{2-6}$-alkanoylamino unsubstituted or substituted by halogen; or $C_{1-6}$-alkylsulfonylamino unsubstituted or substituted by halogen or $C_{1-4}$-alkoxy; which dye contains 1 to 3 sulfo groups.

2. A monoazo dye according to claim 1, wherein the radical —N═N—K is linked to the phenyl ring in the ortho- or para-position to the —SO₂ group.

3. A monoazo dye according to claim 2, wherein X is hydrogen or $C_{1-4}$-alkanoylamino.

4. A monoazo dye according to claim 3, wherein K is N—$C_{1-4}$-alkylaminobenzene or N,N-di($C_{1-4}$)alkylaminobenzene unsubstituted or substituted in the benzene ring by methyl, methoxy or acetamido and wherein the N-alkyl moieties are unsubstituted or each independently substituted by cyano, hydroxy, sulfo or phenyl, or is $C_{1-2}$-alkoxybenzene unsubstituted or substituted by methyl; methoxynaphthalene; phenol substituted by methyl; aminonaphthalene unsubstituted or substituted by sulfo, hydroxynaphthalene substituted by sulfo, aminonaphthol substituted in the naphthalene nucleus by sulfo, and wherein the amino group is unsubstituted or substituted by methyl,α,β-dibromopropionyl,α, β-dibromopropionylaminobenzoyl and 2,6-difluoro-5-chloropyrimidylaminobenzoyl; or is 1-phenyl-3-methylpyrazol-5-one unsubstituted or substituted in the phenyl nucleus by methyl, ethyl and chlorine, 1-phenyl-3-methyl-5-aminopyrazole, 2-methylindole, 1-chlorophenylamino-2-pentylnaphthimidazole substituted in the naphthalene nucleus by hydroxy and sulfo, 1-ethyl-4-methyl-3-carbamoyl-6-hydroxypyrid-2-one, N-methyl- or N-ethyl-1,2,3,4-tetrahydroquinoline or 2,4,6-triaminopyrimidine, and wherein R is hydrogen, chlorine, methyl, methoxy, carboxy, trifluoromethyl, acetamido, $C_{1-2}$-alkylsulfonyl,

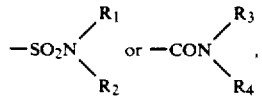

wherein $R_1$ is hydrogen or methyl, $R_2$ is hydrogen, $C_{1-2}$-alkyl, cyclohexyl, β-hydroxyethyl, β-sulfoethyl, sulfophenyl unsubstituted or substituted by methyl, methoxy, chlorine, acetamido and carboxy; disulfophenyl, and mono-or disulfonaphthyl, $R_3$ is hydrogen or methyl and $R_4$ is hydrogen, methyl, β-sulfoethyl or sulfophenyl, or is sulfobenzoyl unsubstituted or substituted by chlorine or methyl; and X is hydrogen or acetamido.

5. A monoazo dye according to claim 4, wherein K is N, N-di($C_{1-4}$) alkylaminobenzene unsubstituted or substituted in the benzene ring by methyl, methoxy and acetamido, and wherein the N-alkyl moieties are unsubstituted or each independently substituted by cyano, hydroxy, sulfo or phenyl, or is 2-methylindole or 1-phenyl-3-methyl-5-aminopyrazole.

6. A monoazo dye according to claim 5, wherein X is hydrogen.

7. A monoazo dye according to claim 6, wherein R is linked to the phenyl ring in the ortho- or para-position to the —$SO_2$ group.

8. A monoazo dye according to claim 5 of the formula

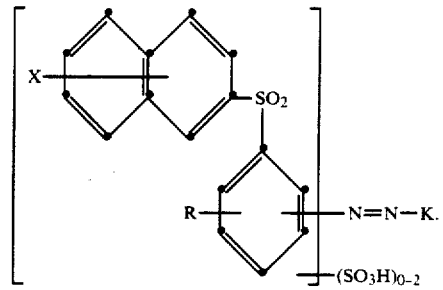

9. A monoazo dye according to claim 8 of the formula

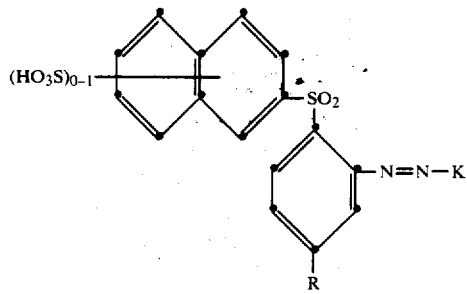

wherein K is 3-methyl, N,N-diethylaniline, 3-methyl-N,N-di-n-butylaniline, 1-phenyl-3-methyl-5-aminopyrazole or 2-methylindole, and R is chlorine, trifluoromethyl, sulfo or —$SO_2NH_2$, and which monoazo dye contains only one sulfo group.

* * * * *